United States Patent
Dehkordi

(10) Patent No.: US 11,067,825 B2
(45) Date of Patent: Jul. 20, 2021

(54) DISPLAY SYSTEM PROVIDING CONCENTRIC LIGHT FIELD AND MONOCULAR-TO-BINOCULAR HYBRIDIZATION

(71) Applicant: Brelyon Inc., San Mateo, CA (US)

(72) Inventor: Barmak Heshmat Dehkordi, San Mateo, CA (US)

(73) Assignee: Brelyon Inc., San Mateo, CA (US)

( * ) Notice: Subject to any disclaimer, the term of this patent is extended or adjusted under 35 U.S.C. 154(b) by 0 days.

(21) Appl. No.: 16/983,791

(22) Filed: Aug. 3, 2020

(65) Prior Publication Data

US 2020/0363650 A1 Nov. 19, 2020

Related U.S. Application Data

(63) Continuation of application No. 16/793,495, filed on Feb. 18, 2020, now Pat. No. 10,768,442.

(60) Provisional application No. 62/820,096, filed on Mar. 18, 2019.

(51) Int. Cl.
*G02B 30/40* (2020.01)
*G02B 30/25* (2020.01)
*H04N 9/31* (2006.01)
*G02B 27/28* (2006.01)

(52) U.S. Cl.
CPC .............. *G02B 30/40* (2020.01); *G02B 30/25* (2020.01); *G02B 27/283* (2013.01); *H04N 9/317* (2013.01)

(58) Field of Classification Search
None
See application file for complete search history.

(56) References Cited

U.S. PATENT DOCUMENTS

| | | | |
|---|---|---|---|
| 6,034,717 A | 3/2000 | Dentinger et al. | |
| 6,243,207 B1* | 6/2001 | Kawamura | H04N 13/322 359/630 |
| 9,164,283 B2* | 10/2015 | Chiang | G02B 27/01 |
| 10,670,864 B2* | 6/2020 | Hirata | B60K 35/00 |
| 2010/0214635 A1* | 8/2010 | Sasaki | G02B 27/0101 359/15 |
| 2012/0120498 A1* | 5/2012 | Harrison | G02B 27/30 359/630 |

(Continued)

FOREIGN PATENT DOCUMENTS

| | | |
|---|---|---|
| EP | 1343333 A2 | 9/2003 |
| JP | 2016035580 A | 3/2016 |
| WO | 2018014044 A1 | 1/2018 |

OTHER PUBLICATIONS

International Search Report and Written Opinion dated Jun. 2, 2020 issued in corresponding International Application No. PCT/US20/20620.

*Primary Examiner* — Nurun N Flora
(74) *Attorney, Agent, or Firm* — Perkins Coie LLP; Jordan Becker

(57) ABSTRACT

A display system for realizing concentric light field with monocular-to-binocular hybridization, and methods thereof. At least some embodiments include a display arranged to emit or transmit light rays based on image content from a content engine, and an optical subsystem arranged to configure the light rays into a concentric light field. The concentric light field provides a virtual image in a large, contiguous spatial region, such that each eye of the human viewer can detect monocular depth from the light field, to provide a large field of view.

31 Claims, 24 Drawing Sheets

(56) References Cited

U.S. PATENT DOCUMENTS

| | | | |
|---|---|---|---|
| 2013/0215925 A1* | 8/2013 | Kaster | H01S 3/0057 372/98 |
| 2018/0024366 A1* | 1/2018 | Ma | G02B 27/283 345/8 |
| 2019/0155033 A1* | 5/2019 | Gelman | G02B 27/0172 |
| 2020/0183148 A1* | 6/2020 | Park | G02B 26/06 |

* cited by examiner

FIG. 6

Monocular-to-binocular hybridization

Waveguide based AR headsets

VR headsets

DISPLAY SYSTEM PROVIDING CONCENTRIC LIGHT FIELD AND MONOCULAR-TO-BINOCULAR HYBRIDIZATION

This application is a continuation of U.S. patent application Ser. No. 16/793,495 filed on Feb. 18, 2020, now U.S. Pat. No. 10,768,442, which claims the benefit of U.S. provisional patent application No. 62/820,096, filed on Mar. 18, 2019, which is incorporated herein by reference in its entirety.

TECHNICAL FIELD

The technique introduced here relates generally to light field displays. More specifically, the technique introduced here relates to a system for creating concentric light field displays with monocular-to-binocular hybridization.

BACKGROUND

In present society, there has been increasing traction towards more immersive light-field and/or autostereoscopic three-dimensional (3D) displays, due to advancement in electronics and micro fabrications. Most current and common autostereoscopic 3D displays can require virtual reality (VR) headgear or similar devices. However, VR headgear can cause eye strain and other similarly-related fatigue issues. These issues occur due to two primary issues with current and common VR headgear. Firstly, most common and current VR headgear divide the image into two viewing zones in which parallax is extracted from those viewing zones and overlapped to procure a seemingly single, whole image. Secondly, most current and common VR headgear have the viewing zones too near to the user's eyes. Another issue with most current and common VR headgear is the binocular gaps in the image projected due to the images being fed into two separate viewing zones, one for each eye of the user with separate optics.

BRIEF DESCRIPTION OF THE DRAWINGS

One or more embodiments of the present disclosure are illustrated by way of example and not limitation in the figures of the accompanying drawings, in which like references indicate similar elements.

FIG. 6 is a diagram showing alternative embodiments of the relay optics of the display system.

DETAILED DESCRIPTION

Figure 1:
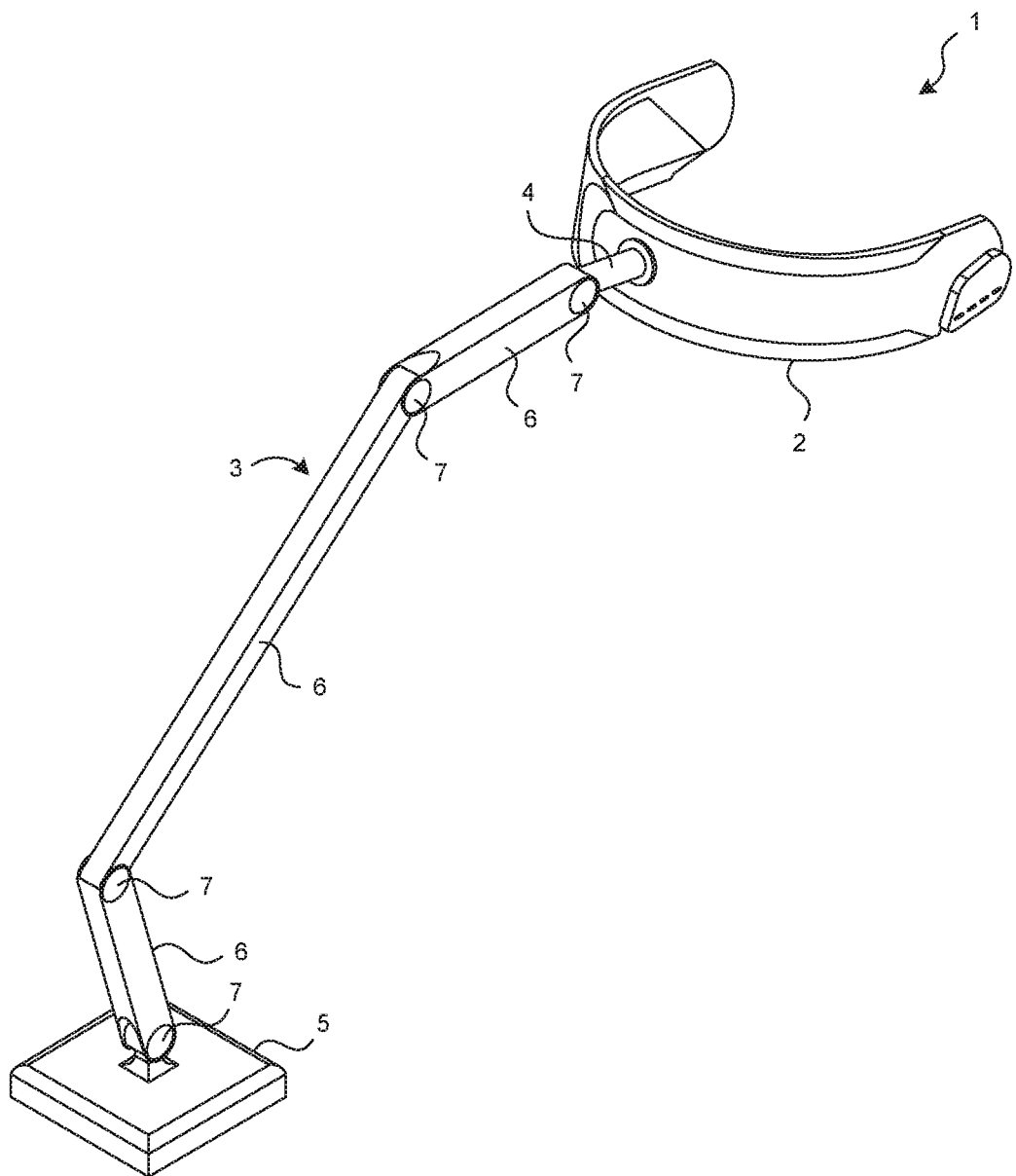
FIG. 1 is a perspective view of a display system including a display portion mounted on a stand.

In this description, references to an "embodiment," "one embodiment" or similar words or phrases mean that the particular feature, function, structure or characteristic being described is included in at least one embodiment of the technique introduced here. Occurrences of such phrases in this specification do not necessarily all refer to the same embodiment. On the other hand, the embodiments referred to herein also are not necessarily mutually exclusive.

All illustrations of the drawings are to be describing selected versions of the technique introduced here and are not intended to limit the scope of the technique introduced here. All references of user or users pertain to either individual or individuals who would utilize the technique introduced here.

The technique introduced here includes a display system that generates a high-quality virtual image, which may be a 2D, stereoscopic 3D and/or multifocal image, where the display system has an intended (designed) viewing point for the human viewer that is at least 10 cm from the display (in contrast with conventional head-mountable displays (HMDs)) but not more than 60 cm from the display, without causing visual discomfort to the human viewer, while providing a diagonal field of view of at least 45 degrees. The system produces a single, contiguous light field that enables simultaneous detection of monocular depth by each eye of the human viewer, where the monocular depth can be greater than the actual distance of the display from the human viewer, and provides an apparent size of the display (as perceived by the human viewer) that is at least twice (2×) the actual size of the display when the human viewer is located at the intended viewing point. "Monocular depth" is the optical depth perceived by one eye, which the eye can accommodate to by varying the focal length of the eye lens. Monocular depth is based on the true curvature of the wavefront of the light. This is in contrast with stereoscopic depth, which is based solely on parallax. With the technique introduced here, monocular depth is also dynamically modifiable and, in contrast with current autostereoscopic displays, is not fixed at the physical location of the surface of the display panel.

For example, in some embodiments, a display system in accordance with the technique introduced here is designed to be positioned about 20 cm from the viewer's eyes and provides an apparent display size (i.e., as perceived by the human viewer) of approximately 80 inches diagonally while using a display that is only approximately 24 inches in size diagonally, with a field of view greater than 90 degrees and a headbox (useful viewing region) that spans at least 60 cm horizontally, all while providing a high quality virtual image without visual discomfort to the human viewer. In this context, "horizontally" means parallel to an imaginary line that passes through the geometric centers of the human viewer's two eyes when the human viewer is viewing the display in the normal (intended) manner.

The technique introduced here produces a concentric light field and provides monocular-to-binocular hybridization. The term "concentric light field" (also called "curving light field") as used herein means a light field in which, for any two pixels of the display at a fixed radius from the viewer (called "first pixel" and "second pixel"), the chief ray of the light cone emitted from the first pixel in a direction perpendicular to the surface of the display at the first pixel intersects with the chief ray of the light cone emitted from the second pixel in a direction perpendicular to the surface of the display at the second pixel. A concentric light field produces an image that is focusable to the eye at all points, including pixels that are far from the optical axis of the system (the center of curvature), where the image is curved rather than being flat, and the image is viewable within a reasonable viewing space (headbox) in front of the light field.

The term "monocular-to-binocular hybridization" (MBH) as used herein refers to the characteristic that a stereoscopic image is produced in a contiguous viewable spatial region that, in at least one dimension (e.g., horizontally), is significantly larger than (e.g., at least twice) the distance between the two eyes of the viewer of the display, where each eye of the viewer can detect the monocular depth that the light field is providing and can detect correct stereoscopic cues on that depth. MBH produces an image that does not require binocular isolation (the isolation of the two images for two eyes, such as is necessary in stereoscopic HMDs or any 3D that requires wearing a pair of glasses) to view, meaning there is no gap between the images seen by the left eye and right eye.

The technique introduced here can provide users with a device that reduces and/or eliminates eyes strain and other similarly-related fatigue on the user's eyes. It can also provide users with a device that provides a concentric light field display in which the image is not divided into two viewing zones. Also, the technique can provide users with a device that does not require the viewing zone to be too close to the user's eyes. The technique introduced here can provide users with a device that allows the user to be at the center of the light field projection, and that eliminates or minimizes binocular gaps in the image projected. The technique introduced here further can provide users with a device that generates continuous converging light ray bundles towards to the user's face in order to create a wrap-around viewing experience or a panoramic viewing experience.

Figure 2:
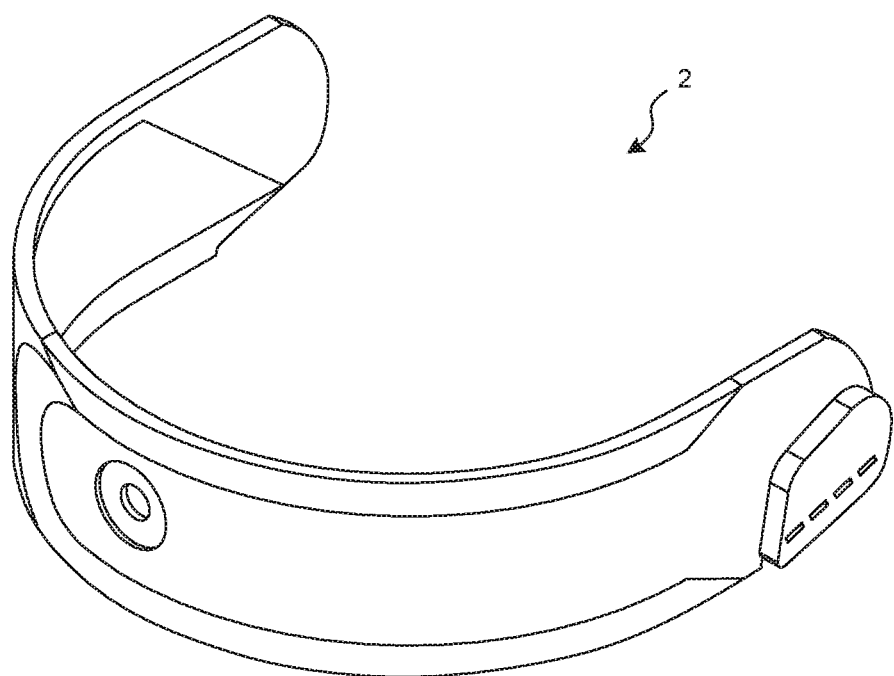
FIG. 2 is a perspective view of the display portion of FIG. 1.
Figure 3:
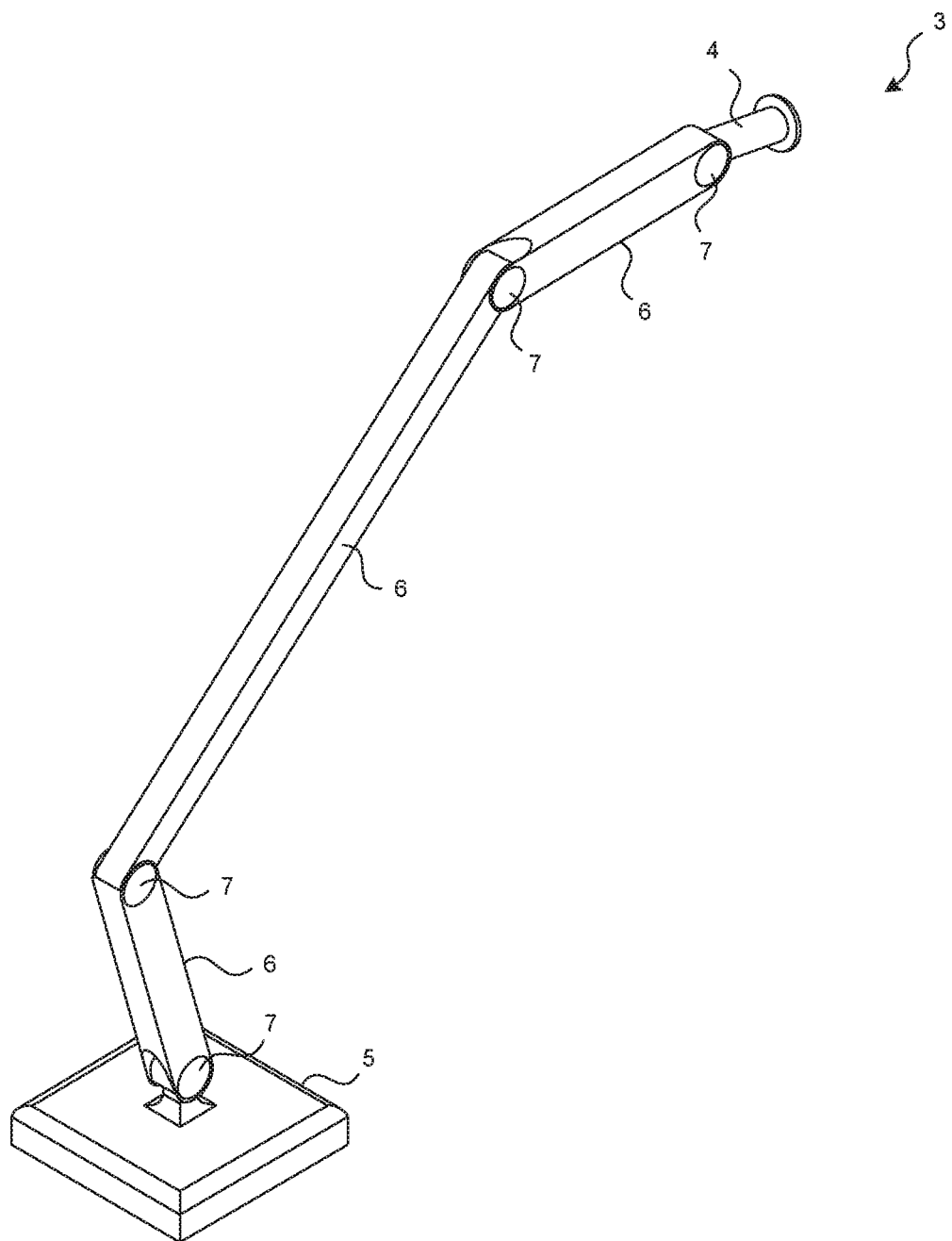
FIG. 3 is a perspective view of the stand of FIG. 1.

The technique introduced here includes systems and methods for realizing concentric light field with MBH. As shown in FIGS. 1 through 3, in certain embodiments a display system 1 according to the technique introduced here includes a display portion 2 and a stand 3, where the display portion 2 is attached to the stand 3 when in use, and may be removably attachable to the stand 3 by a connector 4. FIG. 1 shows a perspective view of the display portion 2 mounted to the stand 3. FIG. 2 shows a perspective view of the display portion 2 by itself, while FIG. 3 shows a perspective view of the stand 3 by itself.

The system is designed to enable the display portion 2 to be positioned very close to the eyes of the user (also called "viewer" herein) when in use, though not as close as in a conventional HMD device. Hence, the stand 3 can include a base 5, and a plurality of elongate members 6 connected by one or more joints 7. At least some of joints 7 may allow pivoting and/or rotational movement of the connected members 6 to allow for adjustment by the user of the position and orientation of the display portion 2, as desired.

In at least some embodiments, the base 5 is connectable to the bottommost member of the plurality of members 6, as illustrated in FIG. 1. The plurality of members 6 can be of any shape, size, material, features, type or kind, orientation, location, quantity, components, and arrangements of components that would allow the technique introduced here to fulfill the objectives and intents of the technique introduced here. The plurality of members 6 can be pivotally attached to one another from end to end. The bottommost member can be mounted to the topside of the base 5. The topmost member can be mounted to the rear end of a connector 4. The rear end of the connector 4 can be mounted to the topmost member of the plurality of members 6, while the front end of the connector 4 is mounted to the display portion 2, as illustrated in FIG. 1.

Figure 4:
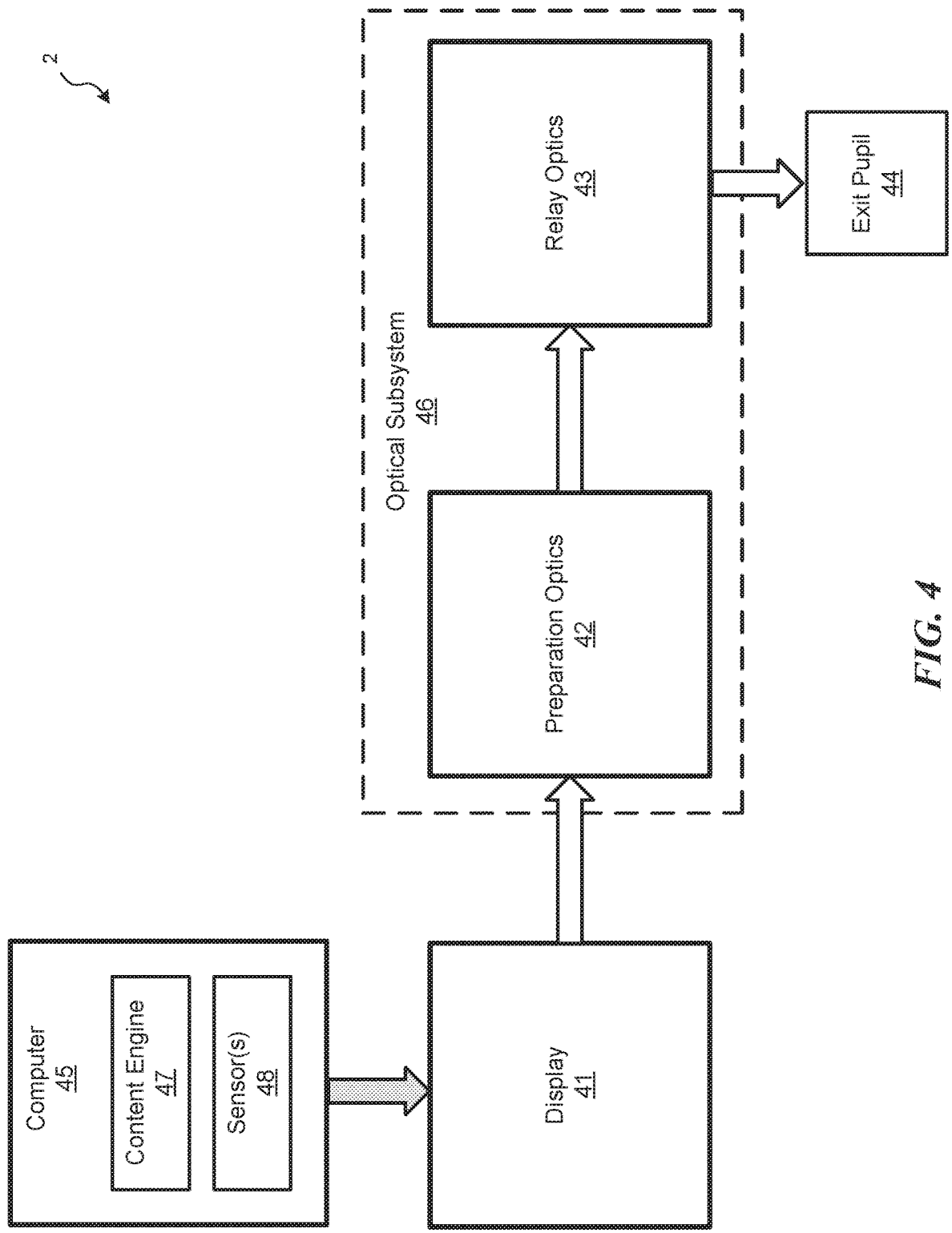
FIG. 4 is a block diagram of components of the display portion of a display system in accordance with the technique introduced here.

The display portion 2 has a mechanical housing that houses, as shown schematically in FIG. 4, a computer 45, at least one display 41 and an optical subsystem 46. The optical subsystem 46 includes the preparation optics 42, relay optics 43 and an exit pupil 44. The computer 45 can be of any shape, size, material, features, type or kind, orientation, location, quantity, components, and arrangements of components that would allow the technique introduced here to fulfill the objectives and intents of the technique introduced here. As shown in FIG. 4, the computer 45 can primarily include a content engine 47 and (optionally) one or more sensors 48. The sensors 48 can include, for example, one or more of tracking sensors, localization sensors, or other similar objects, and/or any combination of the aforementioned items. Such sensors can also include, for example: mapping sensors, camera sensors, time-of-flight sensors, dual mono camera sensor rigs, eye-tracking sensors, hand-tracking sensors, head-tracking sensors, and other similar or similarly-related objects.

The computer 45 can be or include, for example, one or more conventional programmable microprocessors, digital signal processors, application-specific integrated circuits (ASICs), programmable logic devices (PLDs), field programmable gate arrays (FPGAs), or any combination of such types of devices. The content engine 47 in the computer 45 enables the computer 45 to generate digital image content 49 for generation of images. At least a portion of the content engine 47 can be implemented as software or firmware. The digital content 49 can be isolated content to be displayed to the user, content that is based on some localization and/or tracking data surrounding the display, other similarly-related items, and/or a combination of the aforementioned items. The computer 45 may be capable of pre-compensating for distortion or modifications needed on the digital content to produce the images needed to be generated to the user, so that the image (based on the digital content) is emitted from the display portion 2 to the eye of the user with corrected aspect ratio and structure depending on whether the digital image content is 3D, 2D, multi-focal, and/or other similarly-related types or kinds. The computer 45 sends the digital image content 49 from the content engine 47 to the display 41 of the display portion 2. In other embodiments, the computer 45 and/or the content engine 47 may be external to the display portion 2.

Referring still to FIG. 4, the display portion 2 contains at least one display 41 that can generate images from the digital content 49 provided by the computer. The display 41 can be or include, for example, any one or more of: an image panel, a projector, a liquid crystal on silicon device (LCoS); or the like. In the case of a display 41 that is or includes a panel, the panel can be, for example, flat or curved, and can be of a liquid crystal display (LCD), organic light emitting diodes (OLED), light emitting diodes (LED), or other similar related types. In the case of a display 41 that is or includes a projector, the projector can be of a type or kind similar to, for example, the following: a scattering or diffusive screen projected with multiple projectors at different angles, pico-projectors, laser projectors, or other similarly-related objects. The display 41 can feed the image via generated light ray bundles of any form and/or shape to the preparation optics 42. The back light of the display portion 2 may vary with angle to provide autostereoscopic 3D at the concentric region. In some embodiments, such angular light is prepared by Vertical Cavity Surface Emitting Laser arrays (VCSEL). In some embodiments, the display 41 is or includes a stack of LCD panels to provide 3D images with computational methods.

As shown in FIG. 4, the display portion also contains preparation optics 42, which receive the generated light ray bundles from the display, adjust the generated light ray bundles to adjust and/or tune the depth and/or size of the perceived image, and submit the adjusted light ray bundles to relay optics 43. FIGS. 5A through 5D illustrate different embodiments of the preparation optics 42 in detail. In these figures and in subsequent figures discussed below, the arrows show examples of ray bundle paths in the system. The preparation optics 42 may include, for example: a curved (e.g., conjugate) mirror, a lenticular lenslet array, a field-evolving (FE) cavity, a Fresnel plate, a tunable lens, a projection screen, mechanical adjusts, and/or other similarly related or relevant objects. The preparation optics 42 may also be such that the image can be transformed from a 2D format into a 3D presentation.

Figure 5:
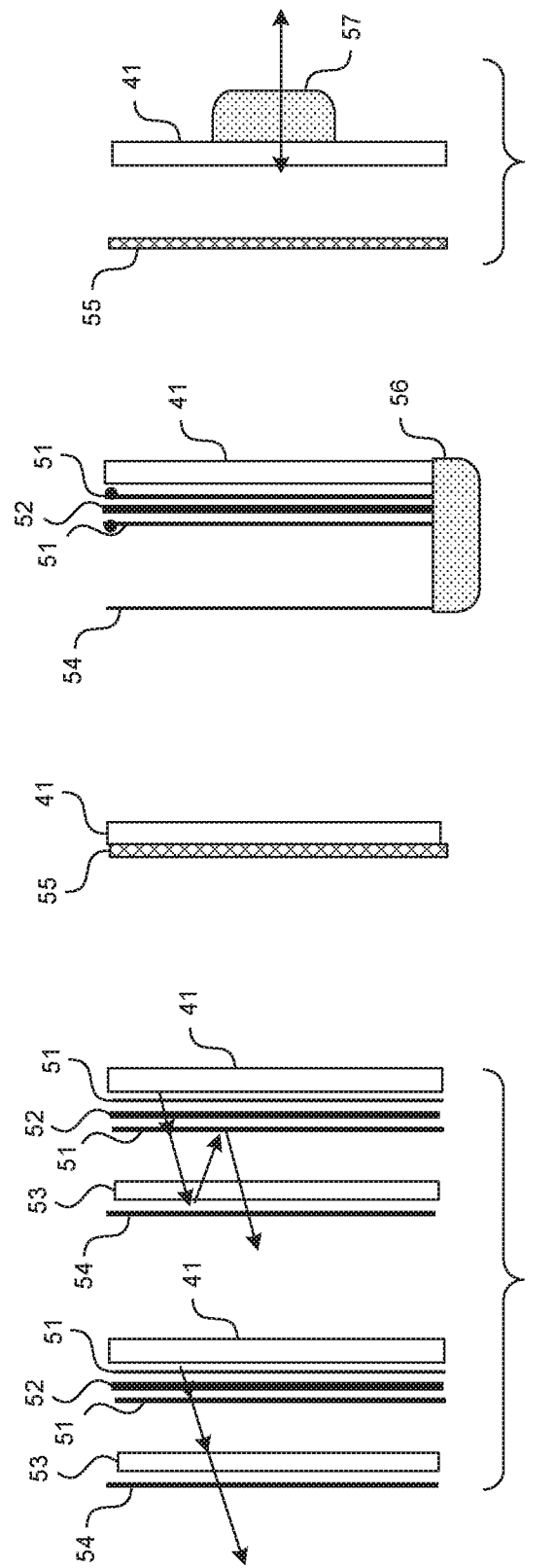
FIGS. 5A through 5D are schematic diagrams of different embodiments of the preparation optics of the display system.

The preparation optics 42 can have any of several alternative embodiments. In the embodiment of FIG. 5A, the preparation optics 42 include a field-evolving (FE) cavity that can change the focal plane of the virtual image by modulating the trajectory of the light ray bundles, i.e., by dynamically modifying the path lengths of the rays. In some instances, the FE cavity can send different sections of the display to different focal distances. In this embodiment, the preparation optics 42 can include a beamsplitter plate 52 between two waveplates 51. One waveplate 51 is near to the display 41, while the other waveplate 51 is nearer to one side of a liquid crystal (LC) plate 53. The other side of the liquid LC plate 53 is near to a polarization-dependent beamsplitter 54.

In FIGS. 5A through 5D and other figures discussed below, the arrows show examples of ray bundle paths in the system. In the left portion of FIG. 5A, light rays emitted from the display 41 are x-polarized. The light rays become y-polarized when they exit the waveplate 51 that is farther from the display 41. They then become x-polarized again when they exit the polarization-dependent beamsplitter 54 toward the viewer (not shown, but toward the left of the figure). Conversely, in the right side of FIG. 5A, light rays reflected back toward the display 41 by the polarization-dependent beamsplitter 54 remain y-polarized, but are converted to x-polarization when they are reflected back (left) toward the viewer by the waveplate 51 that is farther from the display 41.

In the embodiment of FIG. 5B, the preparation optics 42 can include passive optics 55 on the submitting end or side of the display 41, such that the image can be compensated for aberration, distortion, and/or directional brightness correction. Such examples of passive optics 55 can include, for example: Fresnel plates, lenticular lenslet arrays, parallax barriers, layered masks, and/or other similarly-related or similarly-relevant objects.

In the embodiment of FIG. 5C, the preparation optics 42 include a passive FE cavity, the length of which (i.e., distance from display 41 to beamsplitter 54) can be changed or altered via a mechanical actuator 56 or other similar mechanism. In the embodiment of FIG. 5D, the preparation optics 42 include passive optics 55 combined with a mechanical actuator 57 mounted to the display 41 to change the position or distance of the display 41 with respect to the passive optics 55.

Figure 6:
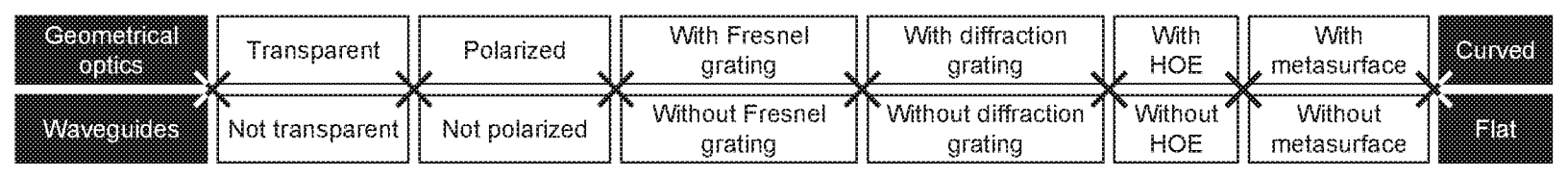

Referring again to FIG. 4, the display portion 2 can also include relay optics 43. The relay optics 43 can be or include, for example, a freeform back visor, a waveguide, a screen with holographic element, or some combination thereof. However, the relay optics 43 can also have any combination of the following features and characteristics: curved or flat, with or without electromagnetic metasurface, with or without a holographic element, with or without diffraction grating, with or without Fresnel grating, polarized or non-polarized, transparent or opaque, utilizing geometrical optics or utilizing waveguides, and/or other similarly-related and/or similarly-relevant objects or features. FIG. 6 illustrates how the relay optics 43 can include any of various combinations of these features/characteristics. The relay optics 43 may receive the submitted light ray bundles from the preparation optics at one end, while being able to relay those light ray bundles through to the exit pupil.

As shown in FIG. 4, the display portion can have an exit pupil 44. The exit pupil 44 can be a hypothetical, three-dimensional manifold surrounding aperture that encircles the ray bundles that are exiting and propagating away from the display portion 2. The exit pupil 44 may be positioned between the front of the user's face and the remainder of the display portion 2 where the image is seen by the user.

In certain embodiments, as discussed further below, the preparation optics 42 include a curved mirror, such as a conjugate mirror, to provide a concentric light field. A conjugate mirror has the shape of a partial ellipse when viewed in cross-section (i.e., an end of the ellipse where its radius is smallest), as viewed in a vertical plane parallel to the viewing axis. An ellipse has two foci (focal points). In the technique introduced here, the display portion 2 is designed to be positioned such that the viewer's head is located at or near (i.e., within several centimeters of) the focal point that is closest to the mirror, and between the two focal points of the ellipse that the mirror partially forms.

Conventionally, most curved mirrors have been hyperbolic, parabolic, bi-conic or spherical. Such mirrors are generally suitable for single point imaging in paraxial regime when the light is close to symmetry axis of the optical elements, such as the ones in telescopes or laser and sensing applications. However, in displays these mirrors fail, because they tend to perform very well at the center but fail at the edges of the image, as the edges are very much off axis and not in paraxial regime anymore. They are not suitable to provide a large horizontal field of view with high image accuracy where the displays and mirror are very close together. For example, if one has a long, flat horizontal display and positions it closer than or at the focal point of the parabolic mirror and looks at the reflection of that through a parabolic mirror, one will see that the image at the center of the display is acceptable, but the image becomes increasingly distorted and/or blurry the farther one looks from the center of the display.

Figure 13B:
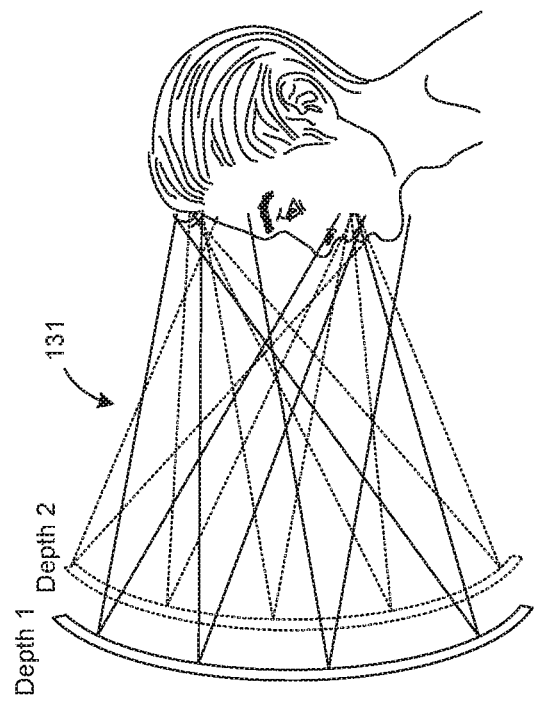
FIGS. 13A and 13B illustrate a planar light field and a concentric light field, respectively.
Figure 13A:
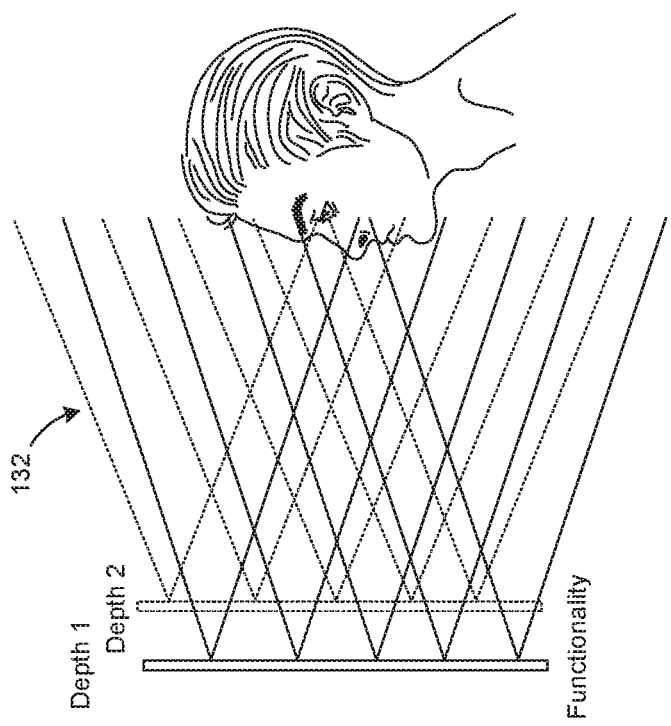

A concentric light field, such as can be produced by use of a conjugate mirror, overcomes these problems. FIG. 13B shows a concentric light field 131, which is shown in contrast with a planar light field 132 illustrated in FIG. 13A. In each of FIG. 13A and FIG. 13B, several bundles of light rays are shown, emanating from various different pixels of the display. In the concentric light field 131 produced by the curved display in FIG. 13B, a perpendicular ray from every pixel will converge toward a focal point and toward perpendicular rays from other pixels. In contrast, in the planar light field 132 of FIG. 13A, perpendicular rays from different pixels are parallel and therefore do not converge. Note that in alternative embodiments, a diffractive mirror or nanostructured mirror can be used instead of a conjugate mirror.

Figure 14:
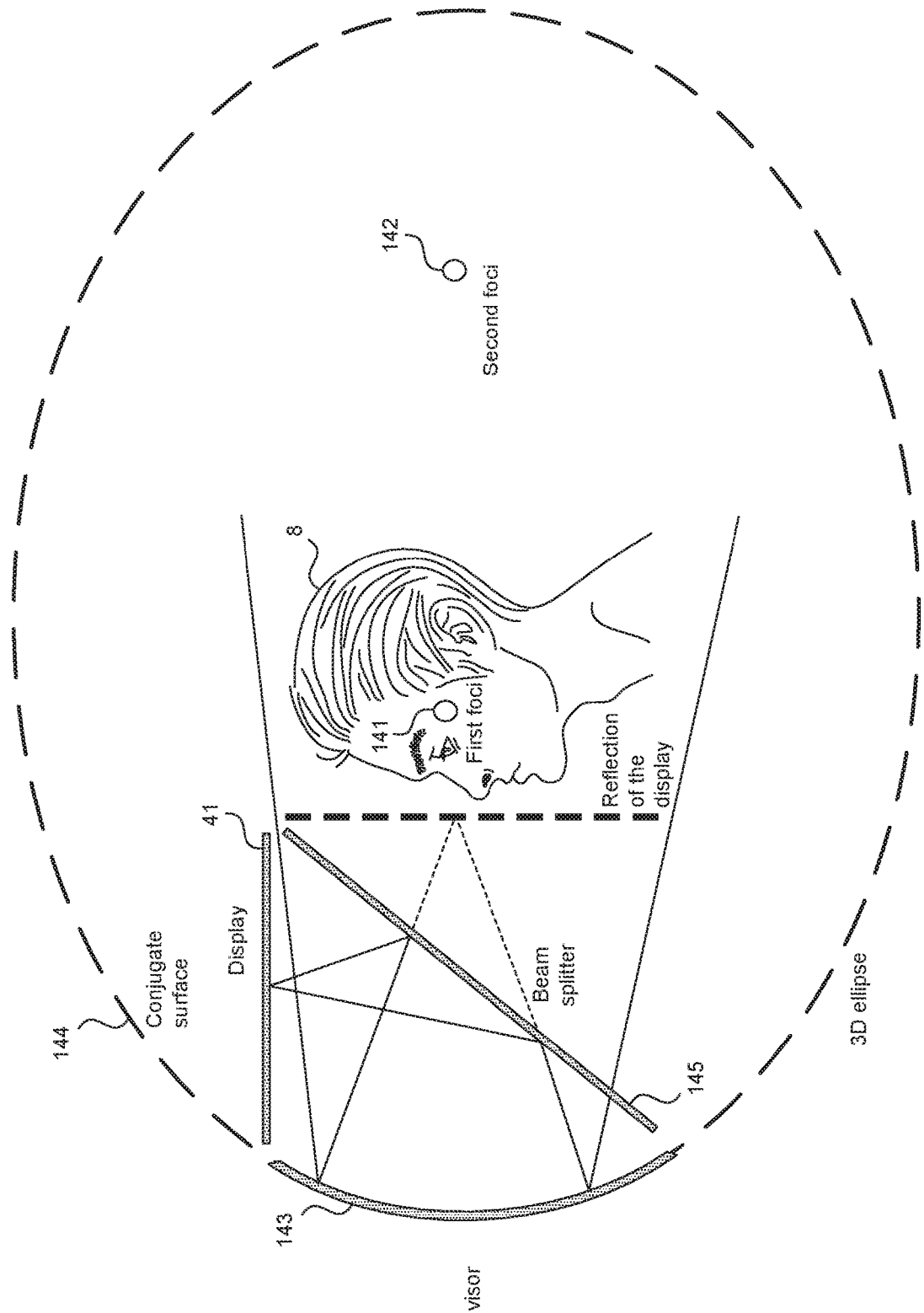
FIG. 14 schematically illustrates the use of a conjugate mirror and a positioning of a human viewer relative to a focal point of the mirror.

In certain embodiments of the technique introduced here, as shown in FIG. 14, the head of the viewer 8 is positioned at or close to the focal point 141 of the conjugate mirror 143 (one of the two foci 141, 142 of the ellipse 144 that the conjugate mirror 143 partially traces). The display 41 is close to the mirror 143, above the user's field of view. A beamsplitter 145 is positioned in the field-of-view at a 45 degree angle as viewed from the side. The other focal point 142 of the ellipse 144 is behind the viewer's head when the viewer is looking at the displayed images.

In at least one embodiment, the distance between the foci 141, 142 of the ellipse 144 is about 1.2 m; and the viewer 8 can perceive a high quality image on the entire display as long as his or her head is positioned within about 10% of that distance (about 12 cm in this example) from the focal point 141 closest to the mirror 143, as measured along the viewer's viewing axis. (not shown) The viewer can move forward or backward within that range (along the viewing axis) and still see the image with high quality. The reflection in the mirror 143, which is what the viewer 8 actually sees, is perpendicular to the axis (not shown) between the foci 141, 142, and therefore is coaxial with the long axis of the ellipse 144. The fact that the viewer 8 is close to one of the foci (e.g., within about 10% of the distance between the foci) of the ellipse 144 allows the viewer 8 to have almost equal distance to each edge of the mirror 143, which reduces edge aberration.

Additionally, the fact that the second focal point 142 of the ellipse 144 is farther away means that, unlike with a parabolic or hyperbolic mirror, light rays propagating from the edges of the conjugate mirror 143 actually do not keep diverging, but instead bend inward faster. This enables pixels further away from the center of the display to be as focused as pixels at the center of the display.

The use of a conjugate mirror in this manner can provide a very large region in which the virtual magnified 2D or 3D image is visible on a curved surface or a curved volume with all pixels being focusable to the eye. This is unlike when one has a lens or magnifying glass in front of a display, since all points on the virtual image are focusable to the eye, including pixels that are far from the optical axis of the system (the center of the curvature), and the virtual image is curved rather than flat.

A curved or concentric light field in accordance with the technique introduced here can illuminate a large area in front of the display that is on the order of tens of centimeters; which is much larger than (e.g., at least 10 times) the approximately 6 cm distance between the two eyes of an average adult person, i.e., at least 60 cm. Consequently, both eyes not only can appreciate the monocular depth that the light field is providing, but they can also pick up correct stereoscopic cues on that depth. Monocular depth is the depth perceived by one eye via accommodation (change in focal length) of the eye lens; binocular depth is perceived based on the parallax between the image in the left eye and right eye. In most conventional systems such as head-mounted displays the curvature is either too steep such that it supersedes natural human horopter, or it is completely flat. This can cause eye fatigue; especially as the field of view increases.

Additionally, the technique introduced here provides a very large field of view with no gaps in the binocular vision. Unlike goggles, where there is a gap between the eyes that makes it appear like looking through two pipes, there is no pipe-like effect (binocular mask) with the technique introduced here. That is due to monocular-to-binocular hybridization (MBH) and the fact the viewable zone is a large continuous area, not two localized points in front of each eye. This allows the user to move and rotate his or her head and still perceive the depth correctly.

The human brain perceives depth based on eight cues, five of which are contextual and three of which are optical. The optical cues are motion parallax, static parallax and accommodation cue. If the wave front of the light is impacted to mimic the virtual distance, then the perceived 3D not only provides the accommodation depth cue but also provides the motion parallax and static parallax. However, a display system may provide only one of these depth cues; for example, autostereoscopic and stereoscopic headsets rely solely on parallax to provide depth. They do not provide the monocular depth cue for all depths for which they provide parallax. All stereoscopic AR/AR headsets and any 3D experience that requires wearing glasses, and most of glasses-free autostereoscopic 3D displays, rely on an approach where light is fed to left eye and right eye with different content to create parallax. Most conventional implementations require wearing some sort of binocular to eliminate the crosstalk between the left eye and right eye.

In contrast, the technique introduced here provides monocular depth (a depth that a single eye can perceive), which is perceivable in a very large contiguous area in front of the display system. This is MBH, which not only provides the correct depth per eye, but also provides matching vergence of the two eyes (parallax) for objects at different depths in the scene.

Figure 15C:
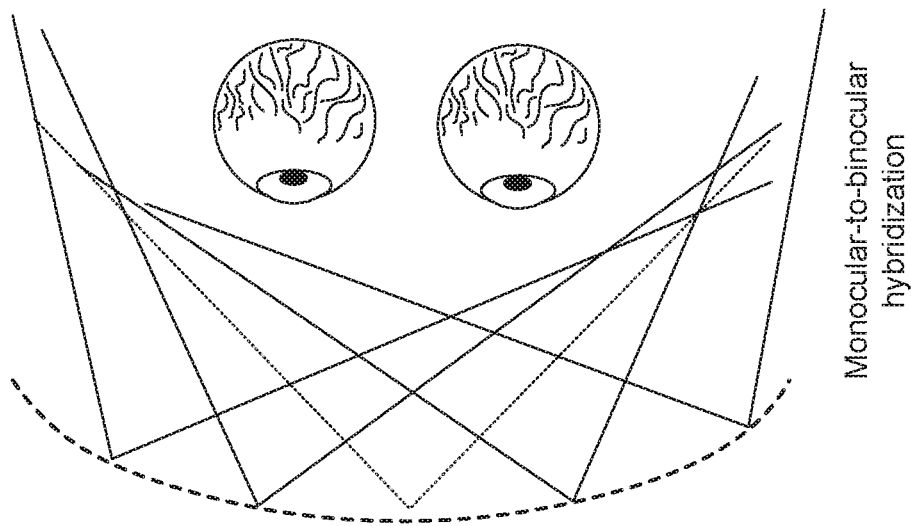
FIGS. 15A, 15B and 15C illustrate examples of VR-based binocular isolation, AR-based binocular isolation, and binocular hybridization, respectively.
Figure 15B:
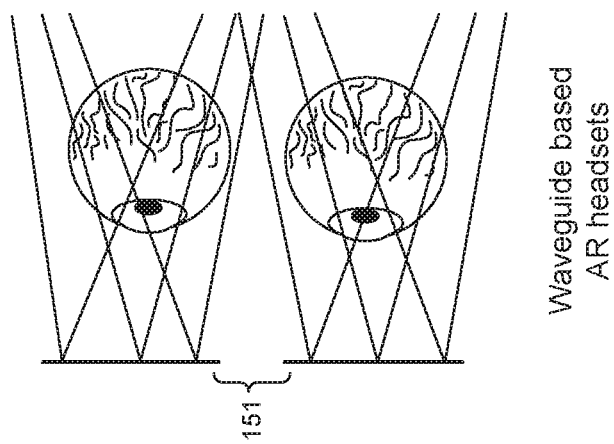
Figure 15A:
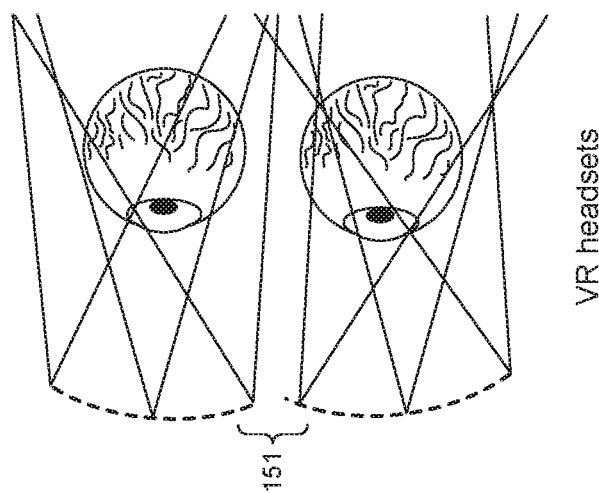

FIGS. 15A, 15B and 15C illustrate differences between conventional techniques and MBH as provided by the technique introduced here. Specifically, FIGS. 15A and 15B show the gap 151 in the binocular region (binocular isolation) that occurs with conventional curved-display HMDs and flat-display HMDs, respectively. In contrast, FIG. 15C shows the MBH (no gap) provided by using the technique introduced here.

Unlike in conventional techniques, the effective binocular viewing area with the technique introduced here is significantly larger than the distance between the viewer's eyes, so that the viewer can rotate and move her head and rotate her eyes to left and right and still see the depth with no gap in between the eyes. Hence, MBH, as provided by the technique introduced here, means the region where monocular depth is perceivable to the viewer is larger than the distance between the viewer's eyes, such that not only the accommodation of each eye is correct but also the vergence of the eyes follows the accommodation. This hybridization creates a much more realistic representation of the depth than conventional 3D displays.

Figure 16:
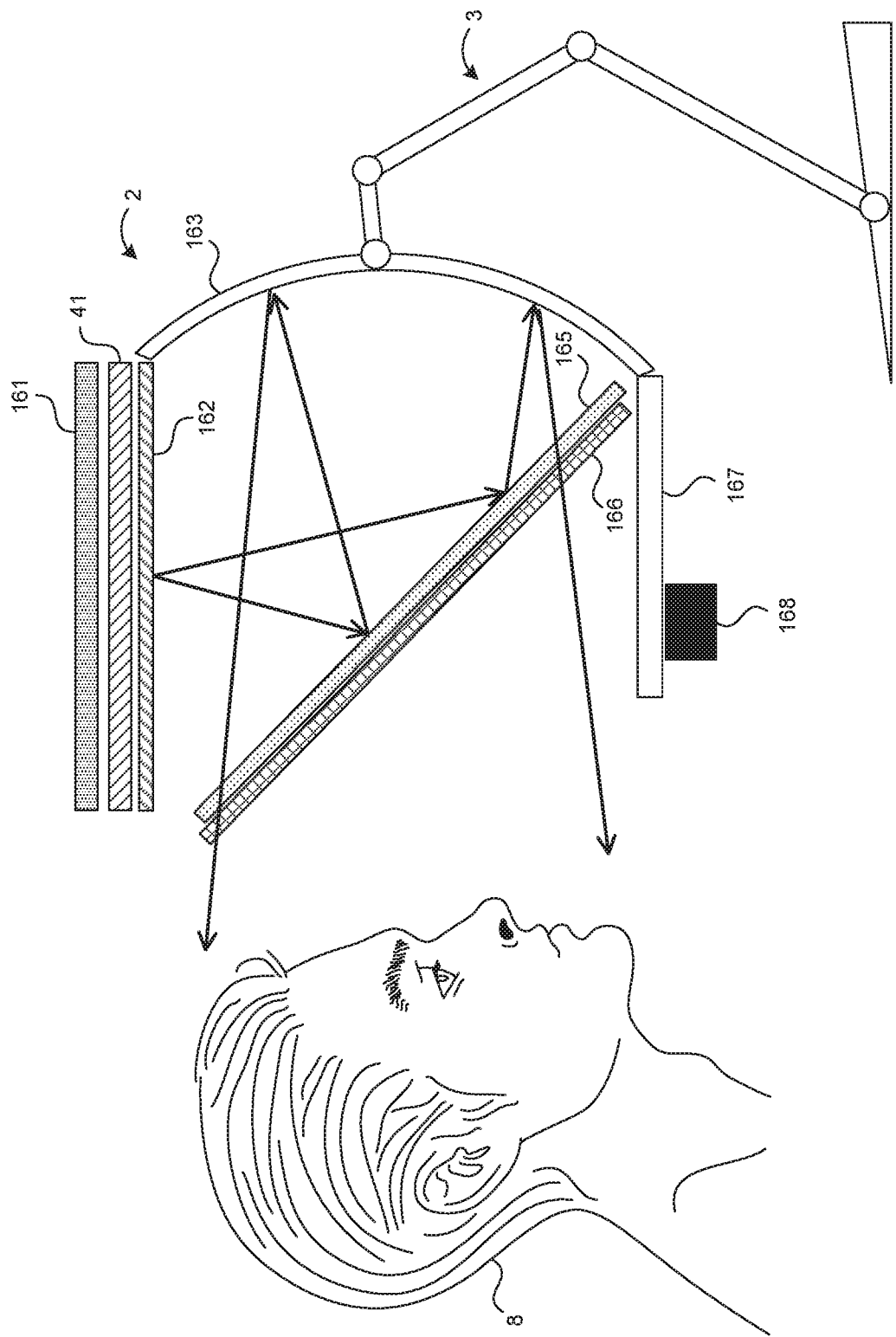
FIG. 16 illustrates an embodiment of the display system that uses a conjugate mirror and a beamsplitter to provide a concentric light field with binocular hybridization.

FIG. 16 shows an embodiment of a display system in accordance with the technique introduced here, which uses a conjugate mirror to achieve concentric light field and MBH. The conjugate mirror 163, which can be occlusive or partially transparent, forms the back of the display portion 2, i.e., the visor, which can be mounted to an adjustable stand 3 as described above. In this embodiment, the display portion includes a flat directional or enhanced backlight positioned in front of and above the mirror, with its light emission surface disposed horizontally facing downward. The display 41 is positioned below and parallel to the backlight 161. The backlight 161 can be either standard side-lit diffusive back light or preferably directional back light, such as backlight with directional film or directional layer on top, or backlight with diffractive layer to change the direction. In at least some embodiments the elements have local dimming techniques, such as micro-LED backlight where backlight can be dimmed in certain regions to provide better contrast and dynamic range. The elements in the backlight can be side-lit waveguide, micro LED array, diffractive directional waveguide, light diffuser, for example.

A privacy film 162 or other type of layer with directional optical transmissive properties is disposed over the downward facing surface of the display 41. The privacy film may have a pass angle smaller than 100 degrees, for example. A beamsplitter 165 is disposed between the mirror 163 and the viewer 8 at a 45-degree angle (as viewed cross-sectionally from the side, perpendicularly to the viewing axis.

In operation, light emitted by the backlight 161 and modulated by the display 41 propagates downward and then reflects off the beamsplitter 165 toward the mirror 163, which reflects the light back toward the beamsplitter 165 with a rotated polarization, such that the reflected light then passes through the beamsplitter 165 and propagates to the eyes of the viewer 8. An absorptive polarizer 166 may be disposed on the lower surface of the beamsplitter 163, to reduce reflections. A lower baffle 167 of the display portion 2 may be disposed below the beamsplitter 163, parallel to the display. One or more audio speakers 168 may be positioned at any convenient locations, such as attached to the underside of the lower baffle 167.

Figure 17:
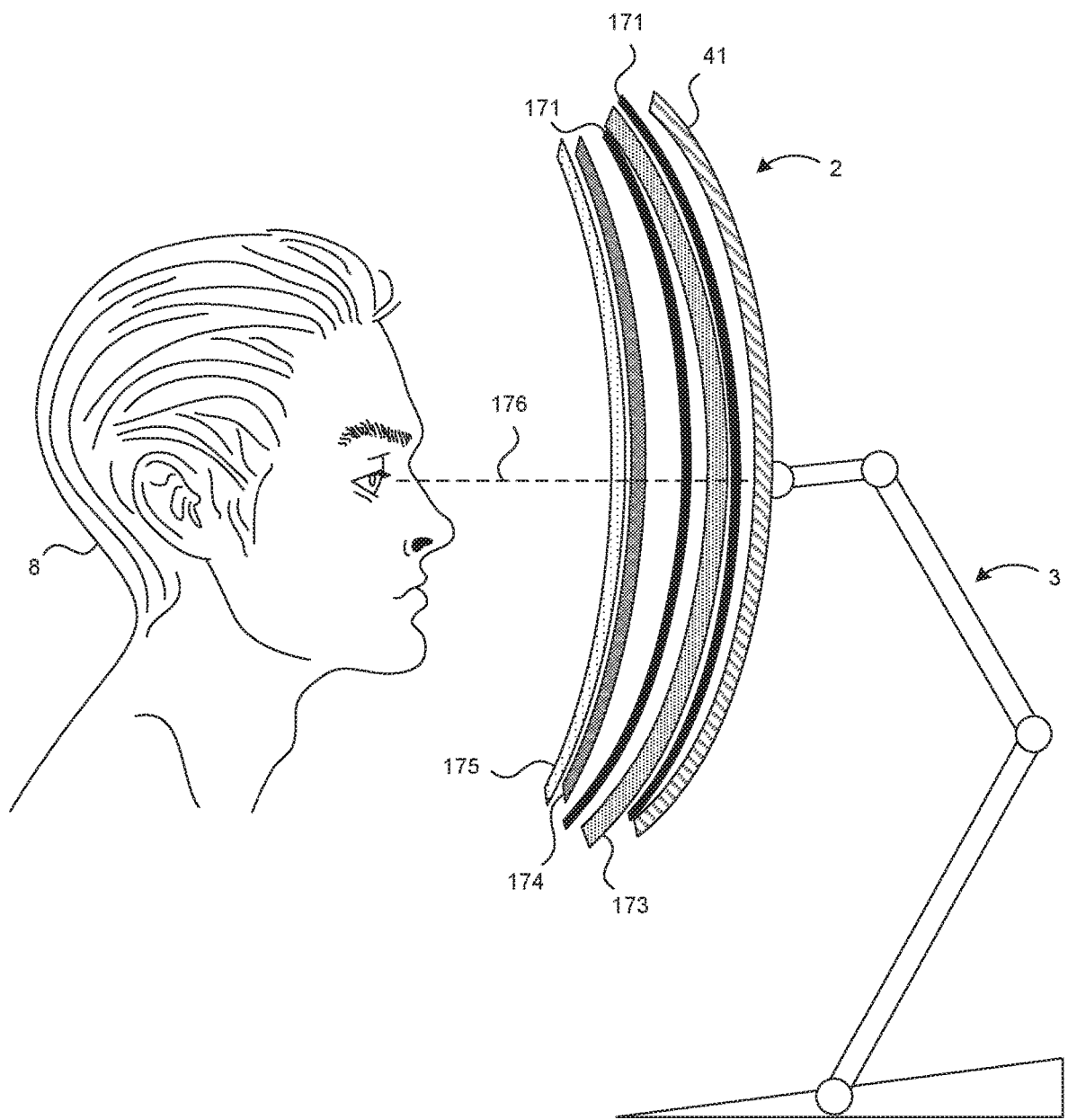
FIG. 17 illustrates an embodiment of the display system that uses a semi-reflective curved mirror with quarter-wave plates disposed on the display, to provide a concentric light field with binocular hybridization.

FIG. 17 shows another embodiment of a display system according to the technique introduced here. In this embodiment, the display portion 2 includes a curved-surface display 41, which can be made of numerous contiguous active displays, such as OLED elements, for examples. A first curved-surface quarter-wave plate 171 is disposed directly upon the light emission surface of the curved display 41. A semi-reflective curved-surface mirror 173 is disposed on top of one quarter-wave plate 171. A second curved-surface quarter-wave plate 171 is disposed directly on the surface of the semi-reflective curved mirror 173. A curved-surface liquid crystal (LC) plate 174 optionally is disposed on the surface of the second quarter wave plate. A curved-surface wire grid polarizer or a polarization-dependent beamsplitter 175 is disposed on the surface of the LC plate 174 (if present) or the second quarter-wave plate 171. Line 176 represents the line of sight of the viewer 8.

Figure 7B:
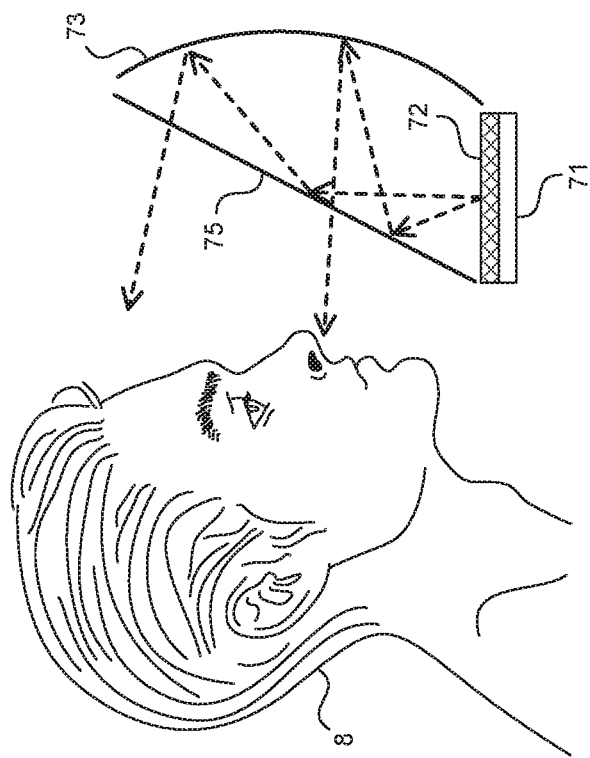
FIGS. 7A through 7D are schematic diagrams of a first set of embodiments of the display system.
Figure 7A:
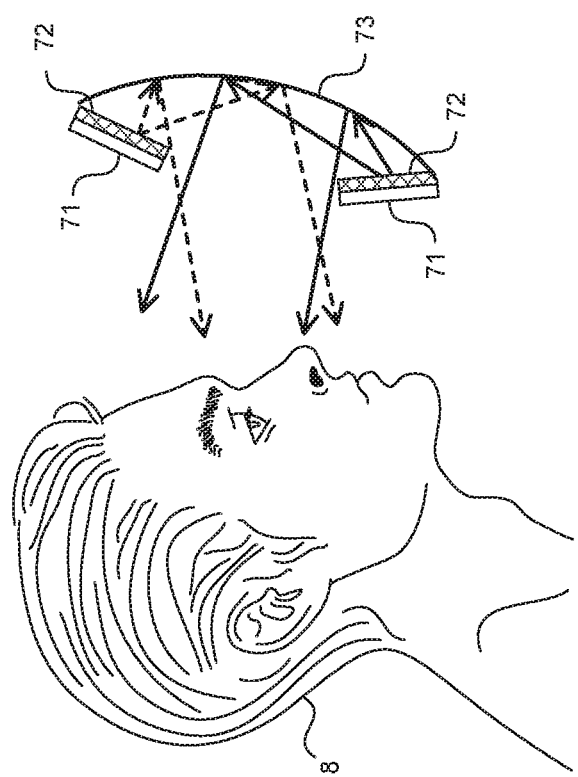

FIGS. 7A through 12 show various additional alternative embodiments and illustrative details of the technique introduced here. In each of these figures, the display portion 2 may be mounted on a stand 3 (e.g., a hinged arm such as described above), which is not shown in these figures for simplicity. In the embodiment of FIG. 7A, the display portion 2 contains at least two display panels 71, one located above the user's field of view and the other beneath the user's field of view. Each display panel 71 is coated with preparation optics 72 on the light emission surface of the display panel 71. Also, in this embodiment the display portion 2 includes relay optics in the form of a freeform back visor 73 to relay or reflect the light ray bundles towards to the user's field of view.

In the embodiment of FIG. 7B, the display portion 2 contains a single display panel 71 beneath (or above, or to the side of) the user's field of view. The display panel 71 can be coated with preparation optics 72 on the surface of the display panel that projects light ray bundles. The display portion 2 in this embodiment also contains a beamsplitter 75 plate adjacent to and/or opposite from the display panel 71, with the preparation optics such that the light ray bundles projected from the display panel with the preparation optics are fed to the beamsplitter plate before reaching or being reflected to the relay optics in the form a freeform back visor, which in turns sends the light ray bundles into the user's field view.

Figure 7C:
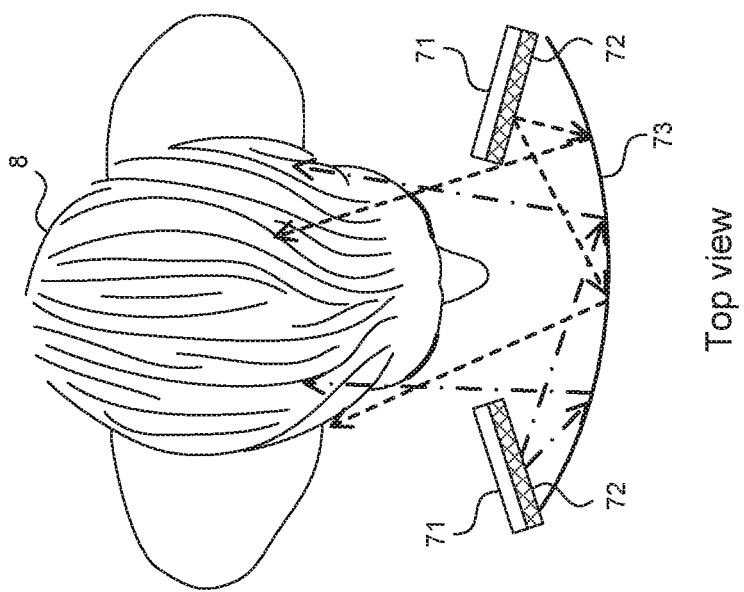

In the embodiment of FIG. 7C, the display portion 2 of this alternative embodiment can be seen as similar to the display portion in FIG. 5A, except that the display panels 71 are located to each side of the user's field of view. In yet another embodiment, shown in FIG. 7D, the display portion 2 of this alternative embodiment can be seen as similar to the display portion in FIG. 7B, except that the relay optics are of holographic element 76 of either a flat or curved feature, instead of a freeform back visor. The holographic element 76 can be in the form of a three-layered panel, with each layer dedicated to different color channels of display, such as red, blue, and green, or some other color space. The dashed line represents the trace of rays coming from the virtual image As shown in FIGS. 8A through 8C, the technique introduced here includes a second set of alternative embodiments of the technique introduced here. In the embodiment of FIG. 8A, the display portion 2 contains a display in the form of at least two projectors 86, with a projector 86 on each opposing side of the user's field of view. Also, in this embodiment, the display portion 2 contains a curved holographic element screen 84, where the light ray bundles are projected from the projectors 86 towards the curved holographic element screen 84. From there, the light ray bundles are redirected towards the exit pupil and through to the user's field of view.

Figure 7D:
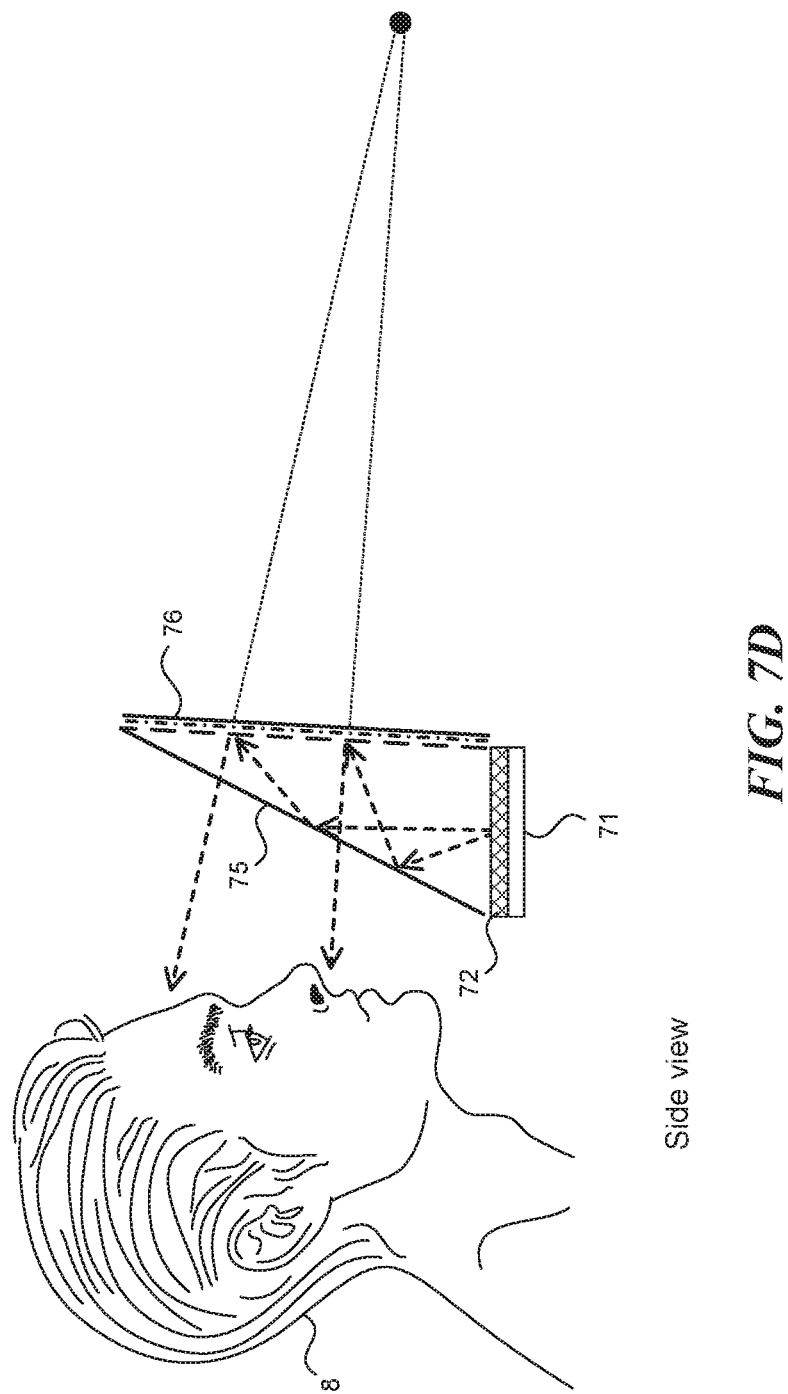
Figure 8A:
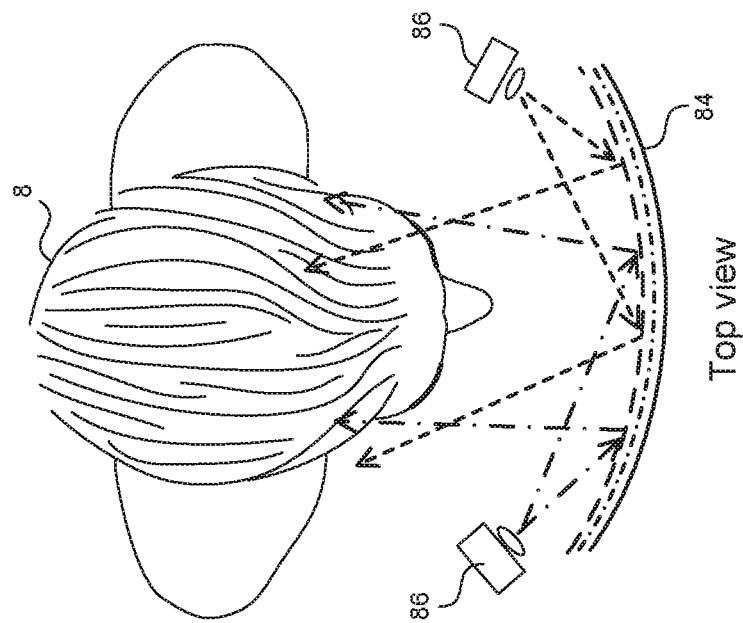
FIGS. 8A through 8C are schematic diagrams of a second set of embodiments of the display system.
Figure 8C:
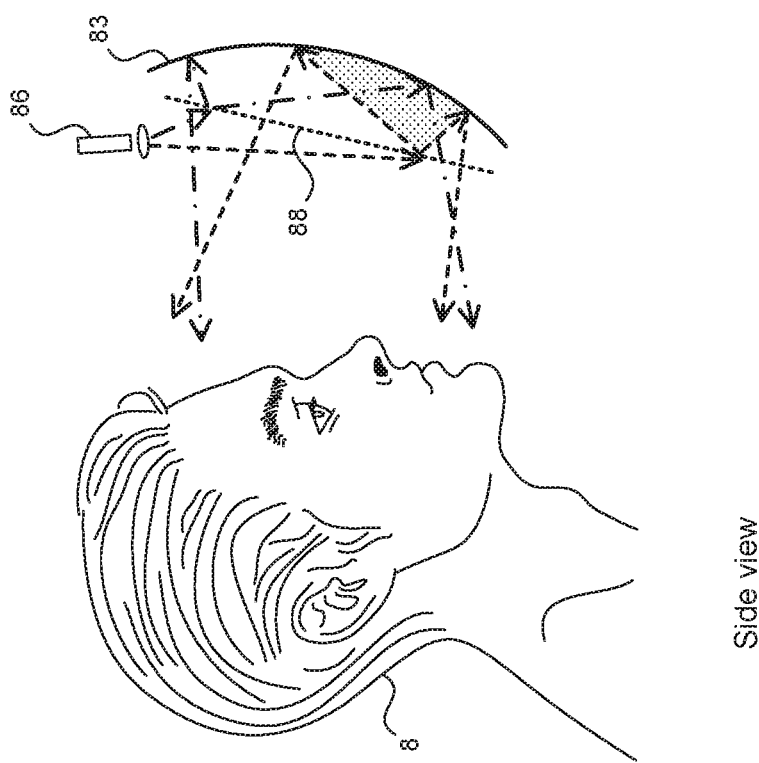
Figure 8B:
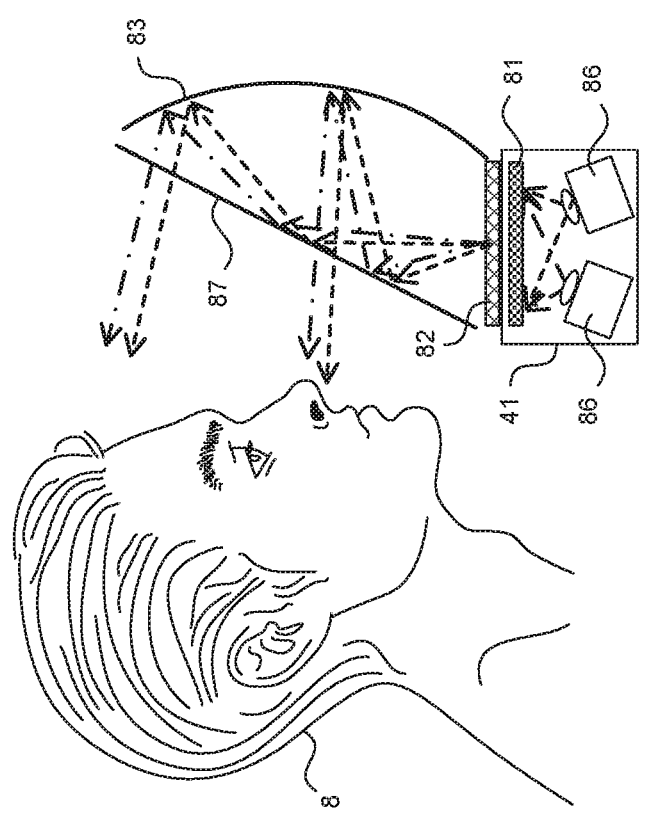

In another embodiment, shown in FIG. 8B, the display portion 2 is similar to the display portion in the embodiments of FIGS. 7B and 7D; however, in this embodiment, the display of the display portion utilizes one or more projectors 86, instead of a flat or curved panel. Each projector 86 can feed the light ray bundles through a scattering screen 81 before passing through the preparation optics 82. The scattering screen 81 may be directional, for example. In at least some embodiments, the scattering screen 81 can be fed by a plurality of projectors 86 to create a high-density display 3D image. This image can then be fed through to the preparation optics 82. Alternatively, the scattering screen 81 can be fed similarly by a plurality of projectors 86 to create a super multiview bundle of light rays for a three-dimensional image that is fed to the relay optics. A beamsplitter 87 is also used in this embodiment, in the manner described above.

In the embodiment of FIG. 8C, the display portion contains one or more projectors 86, relay optics in the form of a freeform back visor 83 and a transparent scattering screen 88, thereby negating the need for a preparation optics. In this embodiment, the projector or projectors 86 can be located adjacent to a side of the user's field of view and adjacent and/or opposite to the transparent side of the transparent scattering screen, as shown. The transparent scattering screen 88 can be made of, for example, mesh-like object with metallic microwire or nanowire arrays such that the light ray bundles can be reflected and/or scattered off the transparent scattering screen towards the freeform back visor, where the convergence of those light ray bundles are prepared for the user's eyes. The transparent scattering screen 88 be capable of operating in transmission mode and/or reflection mode alternatively. The transparent scattering screen 88 may be of various thickness and surface roughness across its face(s), to allow the light ray bundles to be scattered and/or reflected from the transparent scattering screen 88.

Figure 9B:
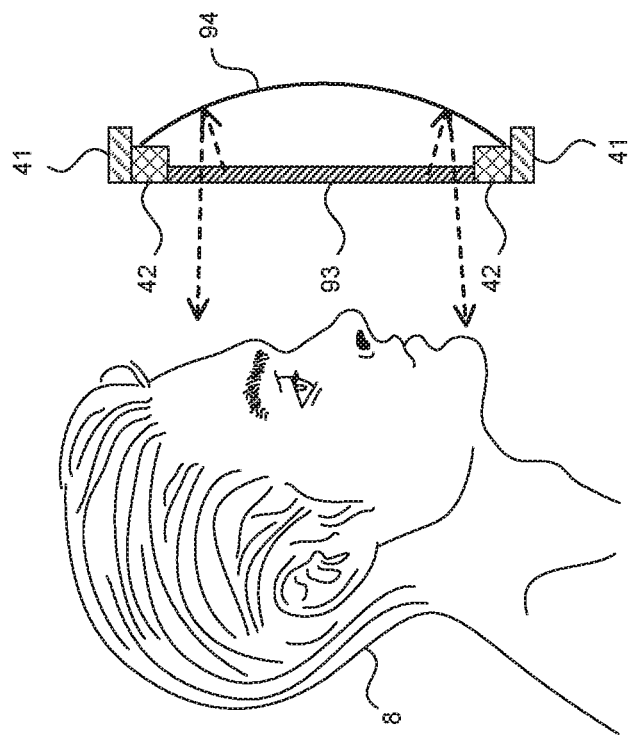
FIGS. 9A through 9C are schematic diagrams of a third set of embodiments of the display system.
Figure 9A:
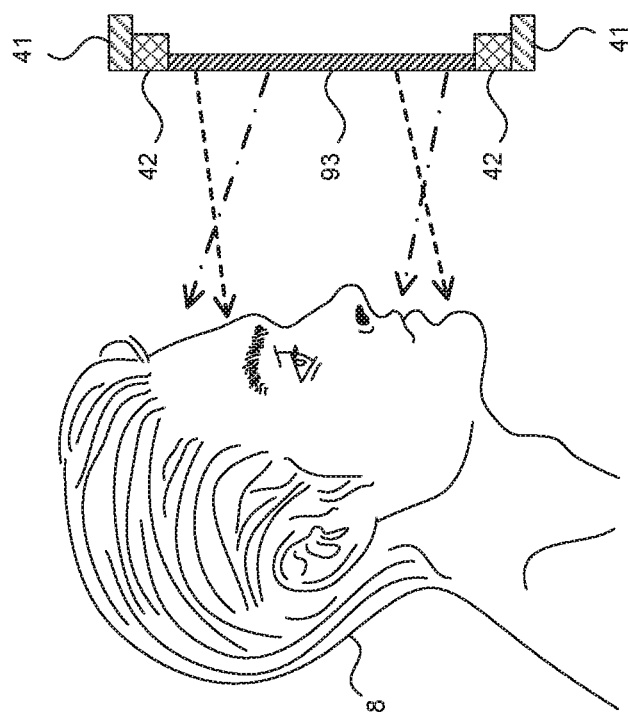
Figure 9C:
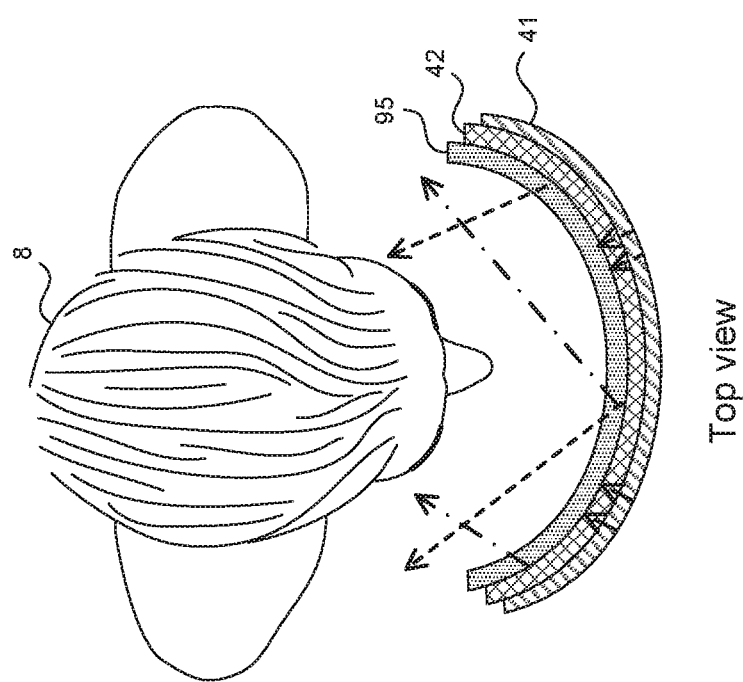

FIGS. 9A through 9C show a third set of alternative embodiments of the technique introduced here. In the embodiment of FIG. 9A, the display portion 2 contains at least two displays 41, one at the top and one at the bottom of the display portion. Each display may be preceded by a preparation optics 42 in the light transmission path. The light ray bundles may be fed from each display 41 through its associated preparation optics 42 into the top end and bottom end of the relay optics 43. In some alternative embodiments, each display 41 and its corresponding preparation optics 42 can be located on the sides of the display portion 2, and more specifically, on the side faces of the relay optics 43 of the display portion 2.

In the embodiment of FIG. 9A, the relay optics can be a waveguide 93. The waveguide 93 may be of a single-layered or a multilayered structure that confines electromagnetic waves and allows few modes of the electromagnetic waves to propagate. The waveguide 93 may be of a flat or a curved panel. The waveguide 93 may be of transparent materials with embedded angled reflecting surfaces to allow the light ray bundles to exit through to the exit pupil. Alternatively, the exiting face of the waveguide 93 may contain a surface featuring diffraction grating such that the light ray bundles can diffract and exit from the waveguide. Or, the waveguide 93 may be similar to a thin sheet of glass such that the light ray bundles are confined to a few modes of electromagnetic waves and allowed to propagate along the exiting face of the waveguide.

Alternatively, the waveguide 93 in the embodiment of FIG. 9A can be a lightguide. The lightguide can be similar to the above-mentioned waveguide in shape, size, material, features, type or kind, orientation, location, quantity, components, and arrangements of components, except that the lightguide can be a single-layered or a multilayered transparent panel such that light ray bundles are reflected only a few times before exiting out the exiting face of the lightguide.

In the embodiment of FIG. 9B, the display portion 2 contains additional relay optics in the form of a freeform back visor 94, such that the waveguide 93 can feed the light ray bundles to the freeform back visor 94 before the light ray bundles are sent through the exit pupil to the user from the freeform back visor 93.

In the embodiment of FIG. 9C, the display portion contains a curved LCoS display 41. The inner or medial face of the curved LCoS display can be coated or covered with preparation optics 42 in the form of a lenticular lenslet array, or similar objects, for example. The inner or medial face of the preparation optics 42 may be covered by a curved waveguide 95. The preparation optics may be in the form of a curved FE cavity, or similar object. In at least some cases in which the light ray bundles from the display can be directional, the display portion 2 may not contain a waveguide or other similarly-related relay optics with reflective, curved surfaces.

Figure 10A:
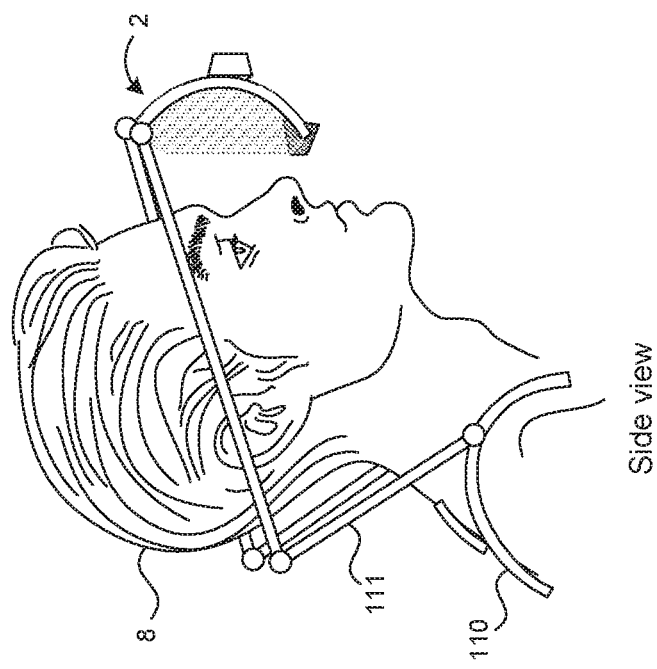
FIG. 10A through 10E are schematic diagrams of the fourth set of embodiments of the display system.

FIGS. 10A through 10E show another set of embodiments of the technique introduced here. In the embodiment of FIG. 10A, the display portion 2 contains one or more spatial mapping and localization sensors 108, each of which can include one or more stereo cameras, time-of-flight cameras, depth cameras, and/or any other modules that can provide depth and/or mapping information. These sensors 108 may acquire, among other things, positional and/or orientational information of the display portion 2. Also, this embodiment can contain eye-tracking modules, head-tracking modules, and/or other modules that provide or utilize information about the position of the user's head and/or gaze to adjust and/or calibrate the image or manipulate the rendered data. The output of these sensors 108 can be used for user interaction with the display or for adjusting the content based on the location of the display, for example. A more specific example is where the display is attached to a swiveling office chair (see, e.g., FIGS. 11B and 11C), and when the user swivels the chair the content of the display changes digitally based on the localization data given by the sensors 108. This provides a digital extension to the physical size of the display and can be used to put different digital files at different locations. Another example is where the light field provides 3D objects that can be interacted with by the viewer and where the sensors 108 can be used to capture and feed back information about the interaction to the display system, to determine the content that should be shown to the user.

Figure 10B:
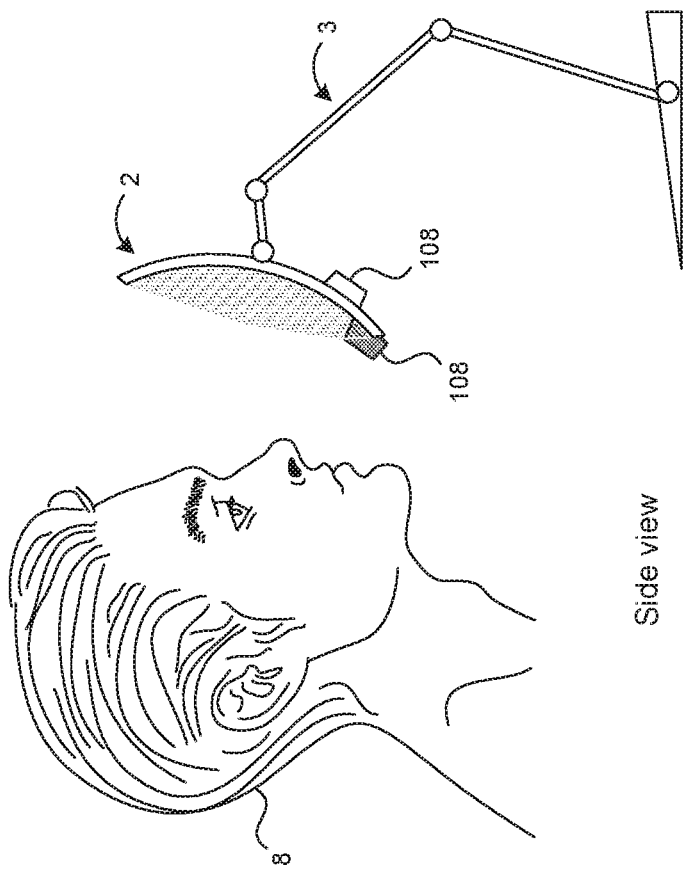

In the embodiment of FIG. 10B, the display portion 2 (which can be similar to the display portion of other embodiments previously discussed above) is attached to a shoulder rest 110 by one or more rigid members 111 or similar objects. The shoulder rest 110 can be similar to, for example, shoulder straps commonly found in objects like backpacks. Also, the shoulder rest may contain the computer 45 (FIG. 4) or another computer (not shown) to assist in rendering images. Alternatively, the shoulder rest 110 can contain a necklace-like object (not shown) that can house such computer(s).

Figure 10C:
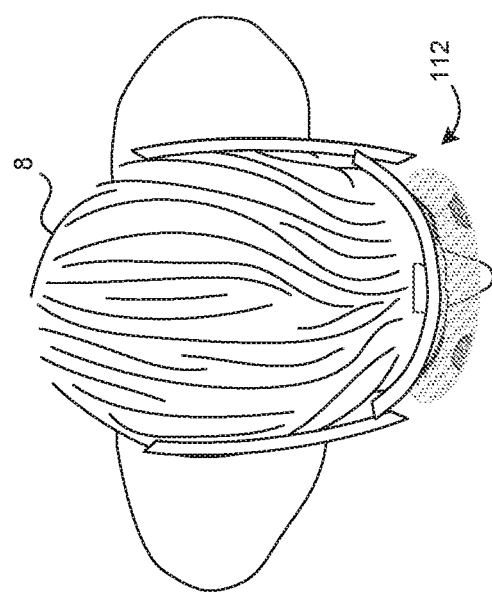

In the embodiment of FIG. 10C, the display portion 2 (which can be similar to the display portion of other embodiments) can be contained within an eyewear-like structure 112. The display portion 2 may contain a singular, continuous relay optics that runs from one end of the user's field of view to the opposite end of the user's field of view, or from one eye of the user to the other eye of the user. The three-dimensional perception may be provided by an autostereoscopic mechanism applied to a singular display.

Figure 10D:
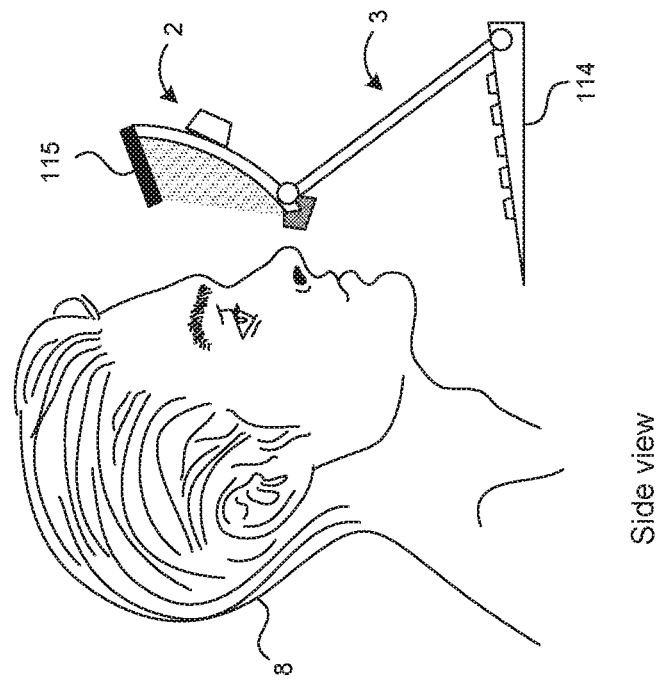
Figure 10E:
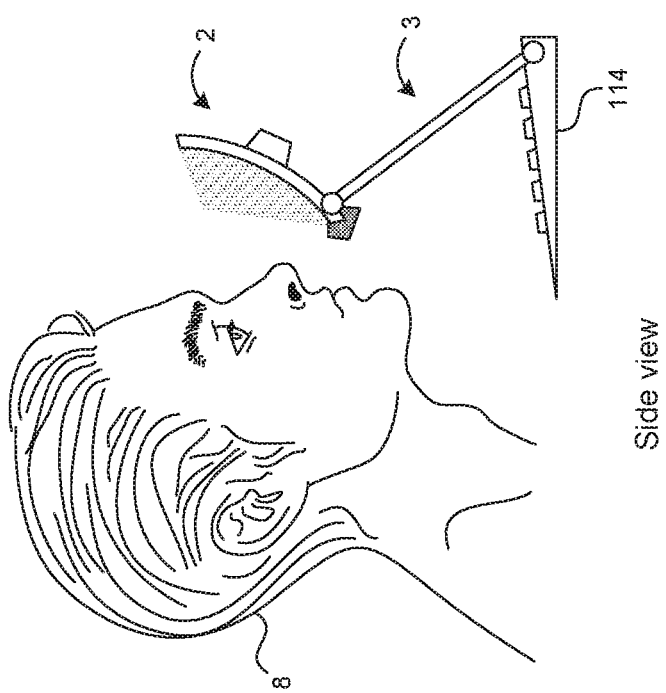

In the embodiment of FIG. 10D, the display portion 2 (which can be similar to the display portion of other embodiments) can be attached to a tablet- or notebook-type computing device 114 by one or more rigid members, such that the display portion 2 can be stowed away into or against the tablet or notebook-like computing device 114. In a variation upon this embodiment, shown in FIG. 10E, the content engine of the display can be included in a smart device 115, such as a cellphone, a tablet, a portable screen panel, or other similar object.

Figure 11A:
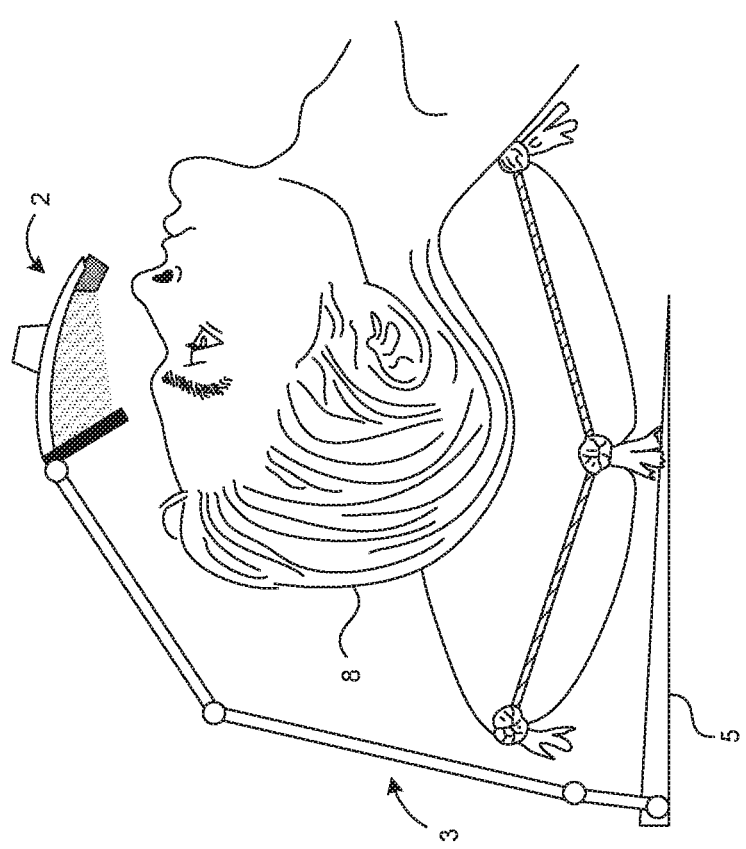
FIG. 11A through 11C are schematic diagrams of the fifth set of alternative embodiments of display system.
Figure 11C:
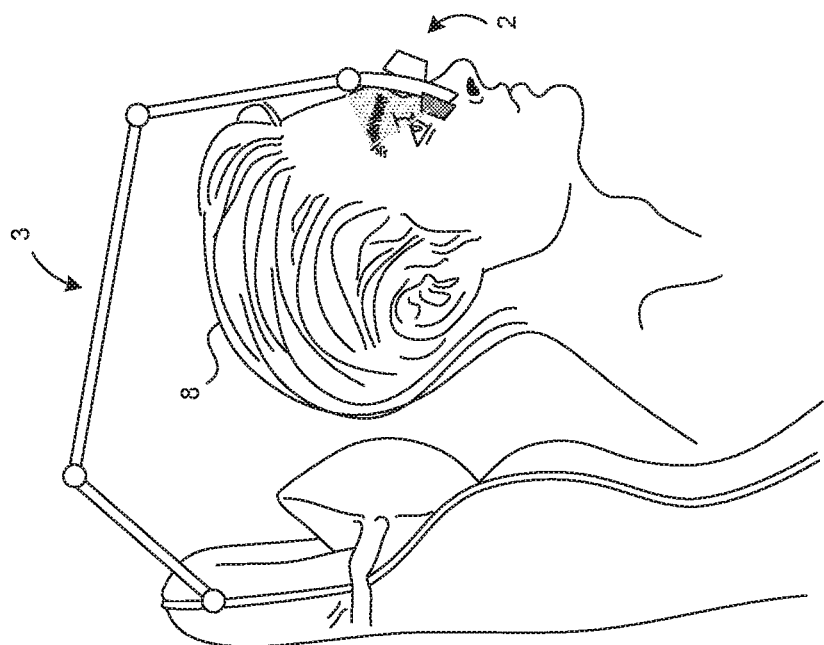
Figure 11B:
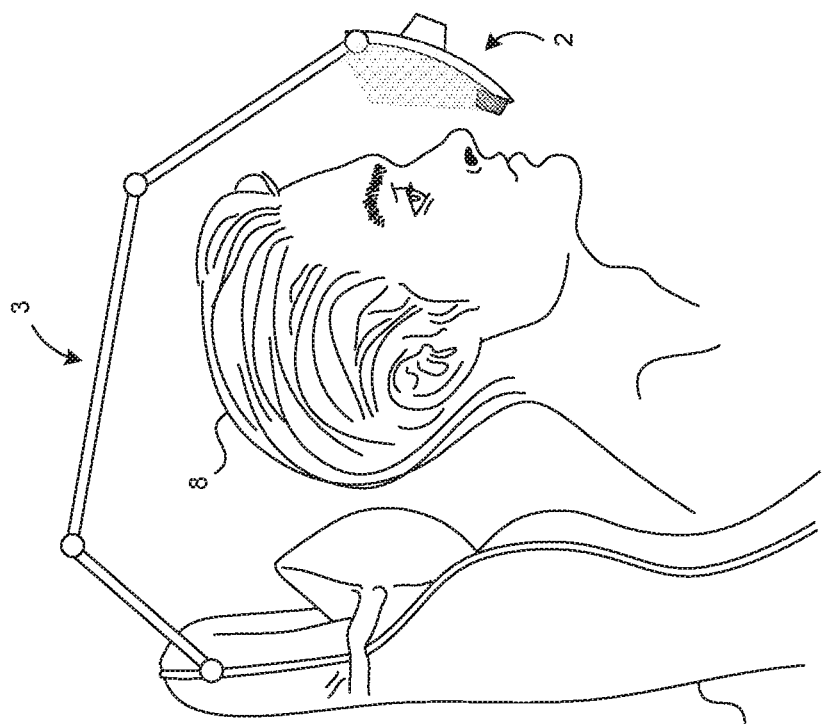

FIGS. 11A through 11C show another set of embodiments of the technique introduced here. In the embodiment of FIG. 11A, the base 5 of the stand 3 can be attached or mounted to a bed or other similar object, such that the user can be lying down while using the display system. In the embodiment of FIG. 11B, the stand 3 can be attached to or mounted to the headrest or backrest of a chair 119, sofa, or other similar object, to allow the user to utilize the technique introduced here in the circumstance that there is not desk or table in which the base of the stand can be rested upon. In some embodiments, the display system can contain other sensors and/or mechanical actuators in which the chair's movements can be synchronized in conjugation with the image content displayed from the display portion, in a manner akin to amusement park rides. In a variation of the embodiment of FIG. 11B, shown in FIG. 11C, the display portion 2 can be worn on the user's face like eyeglasses while at the same type being supported by and/or suspended from the stand 3.

Figure 12:
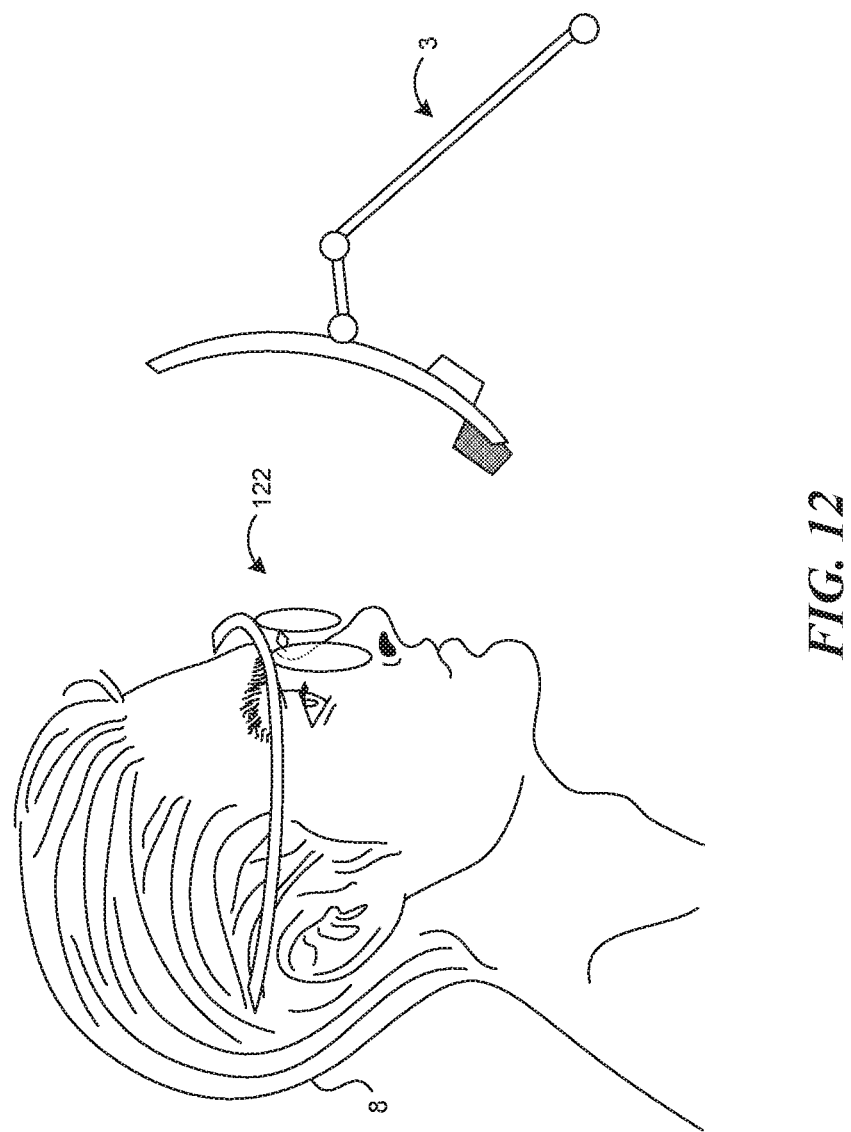
FIG. 12 is a schematic diagram of the display system, in which the display portion includes wearable glasses.

FIG. 12 shows yet another embodiment, in which the display portion 2 includes wearable glasses 122 that the user wears. The wearable glasses 122 can be simple lenses. Alternatively, the wearable glasses 122 can include crossed polarized films over the lenses to provide three-dimensional content in conjugation with the screen that is encoding stereoscopic information into different polarizations. Or, the wearable glasses 122 can contain a plurality of lenses in series such that the depth of field can be increased so that the user's head can be moved nearer to and/or farther from the display portion without loss of optical focus.

EXAMPLES OF CERTAIN EMBODIMENTS

Certain embodiments of the technology introduced herein are summarized in the following numbered examples:

1. A display system comprising: a display arranged to emit or transmit light rays collectively forming a first image; and an optical subsystem optically coupled to the display and arranged to configure the light rays from the display into a single contiguous light field that forms a virtual image based on the first image and that simultaneously encompasses both eyes of a human viewer when the human viewer is viewing the virtual image, such that an apparent size of the display to the human viewer is at least twice an actual size of the display while the display and the optical subsystem are positioned at least 10 cm from the eyes of the human viewer.

2. A display system as recited in example 1, the display system having an intended viewing point for the human viewer that is at least 10 cm from the display and not more than 60 cm from the display.

3. A display system as recited in example 1 or example 2, arranged to provide a field of view of at least 45 degrees diagonally.

4. A display system as recited in any of examples 1 through 3, arranged so that a monocular depth of the virtual image from the human viewer is greater than an actual depth of the display from the human viewer.

5. A display system as recited in any of examples 1 through 4, arranged so that the monocular depth of the virtual image from the human viewer is at least five (5) times the actual depth of the display from the human viewer.

6. A display system as recited in any of examples 1 through 5, arranged so that the light field forms the image in a contiguous spatial region spanning at least 20 cm horizontally in a visual frame of reference of the human viewer, and each eye of the human viewer can detect monocular depth of the display anywhere within the contiguous spatial region.

7. A display system as recited in any of examples 1 through 6, wherein the optical subsystem comprises a curved mirror to produce the light field as a concentric light field.

8. A display system as recited in any of examples 1 through 7, wherein the optical subsystem comprises a conjugate, diffractive or nanostructured mirror.

9. A display system as recited in any of examples 1 through 8, wherein the optical subsystem comprises: preparation optics arranged to adjust a size or depth of the virtual image; and relay optics arranged to receive the light rays from the preparation optics and to relay the light rays to an exit pupil of the display system.

10. A display system as recited in any of examples 1 through 9, wherein the preparation optics comprise a layer to perform directional optical transmission with pass angle smaller than 100 degrees.

11. A display system as recited in any of examples 1 through 10, wherein the preparation optics include a field-evolving (FE) cavity by which to modulate a trajectory of light ray bundles to modify a focal plane of the virtual image.

12. A display system as recited in any of examples 1 through 11, wherein the FE cavity is arranged to set different sections of the display to different depths.

13. A display system as recited in any of examples 1 through 12, wherein the preparation optics comprise a lenslet array.

14. A display system as recited in any of examples 1 through 13, further comprising an adjustable arm, wherein the display and the optical subsystem are housed within a display portion, and the display portion is suspended from an end of the adjustable arm.

15. A display system as recited in any of examples 1 through 14, wherein the adjustable arm comprises a plurality of members that enable adjustment of the adjustable arm.

16. A display system as recited in any of examples 1 through 15, further comprising: a sensor module to acquire positional or orientational information of the display system; and a processor to modify the image based on the positional or orientational information of the display system.

17. A display system as recited in any of examples 1 through 16, further comprising a display portion that includes the display and the optical subsystem; wherein the display is flat and is arranged adjacent to and outside of a field of view of the display system, to emit or transmit light rays into the field of view; and wherein the optical subsystem includes a curved mirror that forms, or that is disposed on, an interior back surface of the display portion; and a beamsplitter disposed within the field of view at an acute angle relative to an output surface of the display, the beamsplitter arranged to reflect the light rays from the display toward the curved mirror, such that the curved mirror reflects the light rays back toward the beamsplitter, which then transmits the light rays reflected by the curved mirror through toward an exit pupil of the display system.

18. A display system as recited in any of examples 1 through 16, wherein the display is curved and is positioned to be in a line of sight of the human viewer when the human viewer is viewing the display; and wherein the optical subsystem includes a pair of curved quarter-wave plates disposed closer to an intended viewing location of the human viewer than the display, at least one of the curved quarter-wave plates being adjacent to the display, and a curved, semi-reflective mirror disposed between the quarter-wave plates in the intended line of sight of the human viewer.

19. A display system as recited in example 18, wherein the optical subsystem further includes: a curved liquid crystal plate disposed on a surface of a one of the quarter-wave plates that is closest to the intended viewing location of the human viewer; and a curved polarization element disposed on a surface of the liquid crystal plate.

20. A display system as recited in any of examples 1 through 19, further comprising: an adjustable arm that includes a plurality of members to allow adjustment of the position of the adjustable arm; and a display portion that includes the display and the optical subsystem, coupled to and suspended from the adjustable arm such that a position and orientation of the display portion are adjustable.

21. A display system as recited in any of examples 1 through 20, further comprising a base to which the display portion is coupled or can be coupled, the base being designed to enable removable attachment of the base to an item of furniture.

22. A display system as recited in any of examples 1 through 21, further comprising a base to which the display portion is coupled or can be coupled, the base being designed to be removably attachable to a torso of the human viewer.

23. A display system comprising: a display arranged to emit or transmit light rays collectively forming a first image, based on image content from a content engine; and an optical subsystem, optically coupled to the display, including a curved mirror and a passive, directional optical element optically coupled to the curved mirror, the optical subsystem arranged to configure the light rays from the display into a single contiguous, concentric light field that forms a virtual image based on the first image and that enables simultaneous detection of monocular depth by each eye of a human viewer, the light field being such that the display system has a designed viewing point for the human viewer that is at least 10 cm from the display and not more than 60 cm from the display and provides a field of view of at least 45 degrees diagonally, the light field further being such that when the human viewer is located at the designed viewing point, a monocular depth of the virtual image is greater than an actual depth of the display and an apparent size of the display to the human viewer is at least twice an actual size of the display.

24. A display system as recited in example 23, wherein the optical subsystem comprises a curved mirror to produce the concentric light field.

25. A display system as recited in example 23 or example 24, wherein the optical subsystem comprises: preparation optics arranged to adjust a size or depth of the virtual image; and relay optics arranged to receive the light rays from the preparation optics and to relay the light rays to an exit pupil of the display system.

26. A display system as recited in any of examples 23 through 25, wherein the preparation optics include a field-evolving (FE) cavity by which to modulate or change a trajectory of light ray bundles to modify a focal plane of the virtual image.

27. A method of displaying content by a display system, the method comprising: acquiring electronic signals indicative of a first image, in a display system; generating, by a display in the display system, light rays that collectively form the image; and configuring the light rays into a single contiguous light field that simultaneously encompasses both eyes of a human viewer and that forms a virtual image based on the first image, the light field enabling simultaneous detection of monocular depth by each eye of the human viewer, the light field being such that an apparent size of the display to the human viewer is at least twice an actual size of the display while the display is positioned at least 10 cm from the eyes of the human viewer.

28. A method as recited in example 27, wherein an optimal viewing point of the image for the human viewer is at least 10 cm from the display and not more than 60 cm from the display.

29. A method as recited in example 27 or example 28, further comprising using a field-evolving (FE) cavity to modulate a trajectory of light ray bundles to modify a focal plane of the virtual image.

30. A method as recited in any of examples 27 through 29, wherein processing the light rays comprises using a conjugate, diffractive or nanostructured curved mirror.

31. A display system comprising: means for acquiring electronic signals indicative of a first image; means for generating light rays that collectively form the first image; and means for configuring the light rays into a single contiguous light field that simultaneously encompasses both eyes of a human viewer and that forms a virtual image based on the first image, the light field enabling simultaneous detection of monocular depth by each eye of the human viewer, the light field being such that an apparent size of the display to the human viewer is at least twice an actual size of the display while the display is positioned at least 10 cm from the eyes of the human viewer.

32. A display system as recited in example 31, wherein an optimal viewing point of the image for the human viewer is at least 10 cm from the display and not more than 60 cm from the display.

33. A display system as recited in example 31 or example 32, further comprising means for using a field-evolving (FE) cavity to modulate a trajectory of light ray bundles to modify a focal plane of the virtual image.

34. A display system as recited in any of examples 31 through 33, wherein the means for processing the light rays comprises a conjugate, diffractive or nanostructured curved mirror.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A display system comprising:
a display arranged to emit or transmit light rays collectively forming a first image, the display including one or more light emission elements positioned so as to be in a direct line of sight of a human viewer when the human viewer is viewing a virtual image generated by the display system; and
an optical subsystem optically coupled to the display and arranged to configure the light rays from the display into a single contiguous light field that forms the virtual image based on the first image and that simultaneously encompasses both eyes of the human viewer when the human viewer is viewing the virtual image, such that an apparent size of the display to the human viewer is at least twice an actual size of the display while the display and the optical subsystem are positioned at least 10 cm from the eyes of the human viewer.

2. The display system of claim 1, the display system having an intended viewing point for the human viewer that is at least 10 cm from the display and not more than 60 cm from the display.

3. The display system of claim 1, arranged to provide a field of view of at least 45 degrees diagonally.

4. The display system of claim 1, arranged so that a monocular depth of the virtual image from the human viewer is greater than an actual depth of the display from the human viewer.

5. The display system of claim 4, arranged so that the monocular depth of the virtual image from the human viewer is at least five (5) times the actual depth of the display from the human viewer.

6. The display system of claim 1, arranged so that the light field forms the image in a contiguous spatial region spanning at least 20 cm horizontally in a visual frame of reference of the human viewer, and each eye of the human viewer can detect monocular depth of the display anywhere within the contiguous spatial region.

7. The display system of claim 1, wherein the optical subsystem comprises a curved mirror to produce the light field as a concentric light field.

8. The display system of claim 1, wherein the optical subsystem comprises a conjugate, diffractive or nanostructured mirror.

9. The display system of claim 1, wherein the optical subsystem comprises:
preparation optics arranged to adjust a size or depth of the virtual image; and
relay optics arranged to receive the light rays from the preparation optics and to relay the light rays to an exit pupil of the display system.

10. The display system of claim 9, wherein the preparation optics comprise a layer to perform directional optical transmission with pass angle smaller than 100 degrees.

11. The display system of claim 9, wherein the preparation optics include a field-evolving (FE) cavity by which to modulate a trajectory of light ray bundles to modify a focal plane of the virtual image.

12. The display system of claim 9, wherein the preparation optics comprise a lenslet array.

13. The display system of claim 1, further comprising an adjustable arm, wherein the display and the optical subsystem are housed within a display portion, and the display portion is suspended from an end of the adjustable arm.

14. The display system of claim 13, wherein the adjustable arm comprises a plurality of members that enable adjustment of the adjustable arm.

15. The display system of claim 1, further comprising:
a sensor module to acquire positional or orientational information of the display system or the human viewer; and
a processor to modify the image based on the positional or orientational information of the display system or the human viewer.

16. The display system of claim 1, further comprising:
an adjustable arm that includes a plurality of members to allow adjustment of the position of the adjustable arm; and
a display portion that includes the display and the optical subsystem, coupled to and suspended from the adjustable arm such that a position and orientation of the display portion are adjustable.

17. The display system of claim 1, further comprising a base to which the display portion is coupled or can be coupled, the base being designed to enable removable attachment of the base to an item of furniture.

18. The display system of claim 1, further comprising a base to which the display portion is coupled or can be coupled, the base being designed to be removably attachable to a torso of the human viewer.

19. The display system of claim 1, wherein the virtual image is an autostereoscopic image.

20. The display system of claim 19, wherein the display is curved.

21. The display system of claim 1, wherein the optical subsystem comprises:
a pair of quarter-wave plates disposed closer to an intended viewing location of the human viewer than the display in the line of sight of the human viewer, and
a semi-reflective mirror disposed between the quarter-wave plates in the line of sight of the human viewer.

22. The display system of claim 21, wherein the optical subsystem further comprises a polarization element disposed to be between the human viewer and one quarter-wave plate of the pair of quarter-wave plates.

23. The display system of claim 1, wherein the optical subsystem further comprises a holographic element.

24. A display system comprising:
a display arranged to emit or transmit light rays collectively forming a first image, based on image content from a content engine, the display including one or more light emission elements positioned so as to be in a direct line of sight of a human viewer when the human viewer is viewing a virtual image generated by the display system; and
an optical subsystem, optically coupled to the display, including a curved mirror and a passive, directional optical element optically coupled to the curved mirror, the optical subsystem arranged to configure the light rays from the display into a single contiguous, concentric light field that forms the virtual image based on the first image and that enables simultaneous detection of monocular depth by each eye of the human viewer, the light field being such that the display system has a designed viewing point for the human viewer that is at least 10 cm from the display and not more than 60 cm from the display and provides a field of view of at least 45 degrees diagonally, the light field further being such that when the human viewer is located at the designed viewing point, a monocular depth of the virtual image is greater than an actual depth of the display and an apparent size of the display to the human viewer is at least twice an actual size of the display.

25. The display system of claim 24, wherein the optical subsystem comprises a curved mirror to produce the concentric light field.

26. The display system of claim 25, wherein the optical subsystem comprises:
preparation optics arranged to adjust a size or depth of the virtual image; and
relay optics arranged to receive the light rays from the preparation optics and to relay the light rays to an exit pupil of the display system.

27. The display system of claim 26, wherein the preparation optics include a field-evolving (FE) cavity by which to modulate or change a trajectory of light ray bundles to modify a focal plane of the virtual image.

28. A method of displaying content by a display system, the method comprising:
　acquiring electronic signals indicative of a first image, in a display system;
　generating, by a display in the display system, light rays that collectively form the first image, the display including one or more light emission elements positioned so as to be in a direct line of sight of a human viewer when the human viewer is viewing a virtual image generated by the display system; and
　configuring the light rays into a single contiguous light field that simultaneously encompasses both eyes of the human viewer and that forms the virtual image based on the first image, the light field enabling simultaneous detection of monocular depth by each eye of the human viewer, the light field being such that an apparent size of the display to the human viewer is at least twice an actual size of the display while the display is positioned at least 10 cm from the eyes of the human viewer.

29. The method of claim 28, wherein an optimal viewing point of the image for the human viewer is at least 10 cm from the display and not more than 60 cm from the display.

30. The method of claim 28, further comprising using a field-evolving (FE) cavity to modulate a trajectory of light ray bundles to modify a focal plane of the virtual image.

31. The method of claim 28, wherein processing the light rays comprises using a conjugate, diffractive or nanostructured curved mirror.

* * * * *